(12) United States Patent
Enomura

(10) Patent No.: US 12,138,612 B2
(45) Date of Patent: Nov. 12, 2024

(54) FLUID PROCESSING APPARATUS

(71) Applicant: M. Technique Co., Ltd., Izumi (JP)

(72) Inventor: Masakazu Enomura, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 811 days.

(21) Appl. No.: 17/418,601

(22) PCT Filed: Dec. 26, 2018

(86) PCT No.: PCT/JP2018/047985
§ 371 (c)(1),
(2) Date: Jun. 25, 2021

(87) PCT Pub. No.: WO2020/136781
PCT Pub. Date: Jul. 2, 2020

(65) Prior Publication Data
US 2022/0062852 A1   Mar. 3, 2022

(51) Int. Cl.
*B01F 35/92* (2022.01)
*B01F 27/271* (2022.01)
(Continued)

(52) U.S. Cl.
CPC ....... *B01J 19/1806* (2013.01); *B01F 27/2711* (2022.01); *B01F 27/2721* (2022.01);
(Continued)

(58) Field of Classification Search
CPC .. B01J 19/1806; B01J 19/0013; B01J 19/006; B01J 19/0066; B01J 19/0073;
(Continued)

(56) References Cited

U.S. PATENT DOCUMENTS

2006/0276108 A1   12/2006   Benson
2010/0155310 A1   6/2010   Enomura
(Continued)

FOREIGN PATENT DOCUMENTS

CN       1863645 A    11/2006
CN     101795772 A     8/2010
(Continued)

OTHER PUBLICATIONS

Machine translation for JP-2016087485 A (Year: 2024).*
(Continued)

*Primary Examiner* — Huy Tram Nguyen
(74) *Attorney, Agent, or Firm* — Birch, Stewart, Kolasch & Birch, LLP

(57) ABSTRACT

A fluid treatment device with a new configuration is provided. The fluid treatment device is provided with an upstream treatment unit defined by treatment surfaces that rotate relative to each other, and a downstream treatment unit arranged downstream of the upstream treatment unit. The upstream treatment unit is configured such that, by passing the fluid to be treated into an upstream treatment space defined by the treatment surfaces, the fluid to be treated is subjected to upstream treatment. The downstream treatment unit is provided with a downstream treatment space which performs the function of retaining and mixing the fluid to be treated by means of a labyrinth seal. An upstream outlet of the fluid to be treated from the upstream treatment unit opens into the downstream treatment space, and the downstream treatment space is configured to use the labyrinth seal to perform the function of controlling retention time. The downstream treatment space is provided with narrow seal spaces, and retention spaces arranged upstream of the seal spaces and wider than the seal spaces, and the upstream outlet opens to a retention space.

20 Claims, 15 Drawing Sheets

(51) Int. Cl.
*B01F 27/272* (2022.01)
*B01F 27/93* (2022.01)
*B01J 19/00* (2006.01)
*B01J 19/12* (2006.01)
*B01J 19/18* (2006.01)
*B01J 19/20* (2006.01)
*B01F 101/00* (2022.01)

(52) U.S. Cl.
CPC .............. *B01F 27/93* (2022.01); *B01F 35/92* (2022.01); *B01J 19/0013* (2013.01); *B01J 19/006* (2013.01); *B01J 19/0066* (2013.01); *B01J 19/0073* (2013.01); *B01J 19/126* (2013.01); *B01J 19/1887* (2013.01); *B01J 19/20* (2013.01); *B01F 2101/2204* (2022.01); *B01J 2219/00094* (2013.01); *B01J 2219/00141* (2013.01); *B01J 2219/00765* (2013.01)

(58) Field of Classification Search
CPC ...... B01J 19/126; B01J 19/1887; B01J 19/20; B01J 2219/00094; B01J 2219/00141; B01J 2219/00765; B01J 19/0086; B01F 27/2711; B01F 27/2721; B01F 27/93; B01F 35/92; B01F 2101/2204; B01F 27/2712; B01F 27/2722; B01F 27/94; B01F 33/00; B01F 35/90
USPC ......................................................... 422/225
See application file for complete search history.

(56) References Cited

U.S. PATENT DOCUMENTS

| | | |
|---|---|---|
| 2010/0202980 A1 | 8/2010 | Enomura |
| 2010/0326321 A1 | 12/2010 | Enomura |
| 2012/0260659 A1 | 10/2012 | Foust et al. |
| 2013/0207051 A1 | 8/2013 | Ryu et al. |
| 2014/0010038 A1 | 1/2014 | Iwako et al. |
| 2015/0037237 A1 | 2/2015 | Nakamura et al. |
| 2015/0174660 A1 | 6/2015 | Maekawa et al. |
| 2015/0283616 A1 | 10/2015 | Maekawa et al. |
| 2017/0129008 A1 | 5/2017 | Enomura et al. |
| 2017/0340564 A1 | 11/2017 | Enomura et al. |
| 2020/0038821 A1 | 2/2020 | Enomura et al. |
| 2020/0108350 A1 | 4/2020 | Enomura et al. |

FOREIGN PATENT DOCUMENTS

| | | |
|---|---|---|
| CN | 101796143 A | 8/2010 |
| CN | 104136367 A | 11/2014 |
| CN | 104136373 A | 11/2014 |
| CN | 104662306 A | 5/2015 |
| CN | 107001810 A | 8/2017 |
| JP | 2005-60281 A | 3/2005 |
| JP | 2006-239638 A | 9/2006 |
| JP | 2007-50340 A | 3/2007 |
| JP | 4359858 B2 | 11/2009 |
| JP | 2011-189348 A | 9/2011 |
| JP | 2012-210621 A | 11/2012 |
| JP | 5378483 B1 | 12/2013 |
| JP | 2014-23997 A | 2/2014 |
| JP | 5561732 B2 | 7/2014 |
| JP | 2016-87485 A | 5/2016 |
| KR | 10-1171333 B1 | 8/2012 |
| KR | 10-2014-0083854 A | 7/2014 |
| KR | 10-2016-0098662 A | 8/2016 |
| WO | WO 2009/008388 A1 | 1/2009 |
| WO | WO 2018/069997 A1 | 4/2018 |
| WO | WO 2018/229719 A1 | 12/2018 |

OTHER PUBLICATIONS

International Search Report, issued in PCT/JP2018/047985, dated Mar. 26, 2019.
Extended European Search Report for European Application No. 18944516.6, dated May 23, 2022.

\* cited by examiner (A)

(B)

FLUID PROCESSING APPARATUS

TECHNICAL FIELD

The present invention relates to modification of a fluid processing apparatus that employs a processing space defined by at least two processing surfaces at least one of which rotates relative to the other. More specifically, the present invention relates to a continuous reaction apparatus which is effective and useful in the fields such as chemistry, biochemistry, agriculture, foods, pharmaceutical drugs, cosmetics, metal industries, particularly for chemical reaction and synthesis.

BACKGROUND ART

In general, a reaction process for obtaining a new substance by a chemical reaction of two or more kinds of substances or one kind of the same substance itself is roughly classified into a batch type and a continuous type. In the batch type reaction process, a solvent, a substrate, a reacting agent, and the like are placed in a container such as a flask used in a laboratory, and then, the reaction is carried out by stirring with a stirrer or the like. Both the batch type and the continuous type have been industrially put into practical use, however, as a matter of course, their reaction fields have a volume. The volume of reaction container affects nonuniformity of reaction condition in its reaction field. For example, in a case where a reacting agent is added to a uniform substrate solution to perform a chemical reaction, a certain period is required to make the concentration of the reacting agent uniform. The same thing can be said for temperature under the reaction condition. That is, in a case where a reaction container is externally or internally heated or cooled, a certain period is required for the entire reaction container to reach a certain temperature, and further, it is considered very difficult to make the entire reaction field in the reaction container at a completely constant temperature. Further, in the case of a batch type reaction container, when a reacting agent is added to a solvent and a substrate in the reaction container, reaction conditions are already different at the start and end of adding the reacting agent. As a result, nonuniformity of reaction conditions in the reaction field caused by the above-described factors affects a reaction product. That is, due to the occurrence of the various reaction conditions in one container, an intended reaction cannot be performed ideally. For example, a main reaction and a side reaction cannot be perfectly selected, resulting in generation of a by-product, and in the case of polymerization reaction, it is difficult for molecular weight distribution of the reaction product to be obtained to be uniform. When including an adhesion of the reaction product onto wall surface of the reaction container, the yield of the product from the reactant is naturally low. In order to solve these problems in the reaction field, the reaction container is usually equipped with stirring device such as a stirrer and a turbine. The mixing speed of the mixed reaction fluid in the reaction container is increased by means of the stirring device to ensure uniformity in the reaction field and to increase the reaction speed. However, when the viscosity of the targeted mixed reaction fluid increases every time, the problem of nonuniformity in the reaction field is emerges again. Nevertheless, by trying for instantaneous mixing, the power required for stirring naturally increases. Further, there is also a problem that when heating in the short period due to the large temperature gradient, excessive heat energy is required.

In addition, despite that the reaction process such as described above is frequently used in a chemical industry, there is always a concern about safety issues and risks. In many cases, a relatively large amounts of a highly toxic chemical substance are used, indicating considerable dangers to humans and environment, and since the fact that solvents are substance to cause pollution to an environment in many aspects, particular problems occur. For example, in the case of Friedel-Craft acylation, there is a risk of strong exothermic reaction, and in the case of nitration, there is a risk of not only exothermic reaction but also large explosion. Furthermore, those dangers become more real when upscaling for actual production.

In order to solve the above problems, as shown in Patent Document 1 and Patent Document 2, microreactor, micromixer and microreactor which are a micro flow-path reactor have been proposed, and advantages such as capable of synthesizing in a very small amount, higher efficiency of temperature control, higher efficiency of interface reaction, and efficient mixing are advocated. However, when using a general microreactor, even though there are many advantages in microdevice and systems, in reality, there are many problems such that as diameter of the micro-flow path is getting smaller, pressure loss thereof is inversely proportional to the fourth power of the flow path, that is, an extremely high feeding pressure is required that is difficult to obtain a pump that actually feeds a fluid, and in the case of reaction involving the separation, the reaction is expected by a phenomenon that the product is clogged in the flow path, clogging of the microflow path by bubbles generated due to a reaction, and further basically diffusion speed of molecular, therefore, microflow path is not effective and adaptable to all reactions, and it is necessary to carry out reactions by trial and error method repeatedly and select the ones which are successful. Therefore, as shown in Patent document 1, the problem of sediments generated in the microreactor is avoided by ultrasonic treatment, however, the irregular turbulence flow and cavitation generated in the flow path due to the ultrasonic wave are unlikely to always act favorably for the desired reaction. Upscaling has further been solved by the way of increasing the number of microreactor, namely by numbering-up, but the number of microreactors which can be stacked is limited to several dozen, thus it is natural to focus on products with high product value, and further, increasing of the number of the devices means to lead increasing of the absolute number of malfunction causes, therefore, when the problem such as clogging occurs, it may be very difficult to detect a problem site such as the malfunction site.

In order to solve these problems, the method for producing an organic compound as described in Patent Document 3 was proposed by the applicant of the present invention. Patent Document 3 describes the method for producing an organic compound which comprises, for example, a fluid containing at least one kind of organic compound and a fluid containing at least one kind of reacting agent are merged in a thin film fluid formed between processing surfaces which are disposed in a position facing each other so as to be able to approach to and separate from each other, at least one of which rotates relative to the other, and the various organic reactions are conducted in the thin film fluid. Since the organic reactions are conducted in the thin film fluid, uniformity of the reaction can be ensured, and up-scaling is made possible.

However, even when the method for producing an organic compound described in Patent Document 3 is used, similar problems as mentioned above can be seen such as attempting the trial-and-error method for the reaction and selecting a successful one.

The first problem to be solved is to ensure the reaction time. Since each fluid is merged in the thin film fluid formed between the processing surfaces, the diffusion efficiency is unprecedentedly high, and as a result, complete mixing can be achieved, however, especially in the case of an organic reaction, there were cases which are desired to prolong the absolute reaction time. In order to shorten the reaction time, the trial and error such as raising the reaction temperature extremely high and increasing the amount of catalyst was repeated, however, adverse effect such as increase in by-products and dangers are also conspicuous. Further, when the processing surfaces are made extremely large, the reaction time may be ensured, but this is not practical because there are problems of a high cost, a large installation area, and so forth.

Patent Document 4 filed by the applicant of the present invention discloses that each fluid is merged in a thin film fluid formed between processing surfaces which are disposed in a position facing each other so as to be able to approach to and separate from each other, at least one of which rotates to the other, a vessel is provided to separate the fine particles in the thin film fluid and to catch a discharged solution that is discharged from between the processing surfaces, and a tubular container is connected to the lower end of the vessel so that the nuclei and crystallites of the fine particles contained in the discharged solution are grown in the tubular container. However, although this proposal is useful for growing the crystal nucleus and the crystallite, for example in the case of the organic synthesis, a considerably large tubular container is required to satisfy a retention time of the discharged solution in the tubular container, and in addition, only mere flowing of the discharged solution through the tubular container cannot satisfy the condition for obtaining desired reactant as well as the problem of clogging in the tubular container also occur. Further, in many cases, an additional stirrer as well as a solution-sending system may be required.

Patent Document 5 filed by the applicant of the present invention discloses a fluid processing apparatus that is configured such that, in a microreactor employing a circular flow path that is defined between processing surfaces that rotate relative to the other, a cylindrical stirring space is provided inside of the circular flow path in a diameter direction, stirring blades and a screen are arranged in the stirring space, a stirring energy is applied by the stirring blades to the fluid to be processed just immediately before being introduced the circular flow path and a shear force is applied between the stirring blades and the screen. Patent Document 5 realizes a homogeneity of the fluid to be processed that is introduced into the circular flow path thereby realizing a uniform reaction in the circular flow path, however, there is no specific description as to further processing of the fluid that is discharged from the circular flow path.

Patent Document 6 discloses a mixing apparatus to mix one or a plurality of fluids, in which a volumetric body is arranged in the downstream side of a static microreactor. The volumetric body forms a labyrinth wall inside thereof to form a labyrinth-type flow path, and the labyrinth-type flow path is formed to facilitate mixing by generating a turbulent flow in the fluid that is passing therethrough.

PRIOR ART DOCUMENTS

Patent Documents

Patent Document 1: Japanese Patent Laid-Open Publication No. 2005-060281
Patent Document 2: Japanese Patent Laid-Open Publication No. 2007-050340
Patent Document 3: Japanese Patent No. 5561732
Patent Document 4: Japanese Patent Laid-Open Publication No. 2014-023997
Patent Document 5: International Patent Laid-Open Publication No. 2018-069997
Patent Document 6: Japanese Patent Laid-Open Publication No. 2006-239638

DISCLOSURE OF INVENTION

Problems to be Solved by the Invention

In view of the mentioned above, the present invention is to provide a fluid processing apparatus having a novel configuration, and an object of present invention is to provide an inexpensive and simple fluid processing apparatus which is continuous type, capable of scaling up while being compact, and capable of producing an intended reaction product with a high efficiency in various reaction processes.

Especially, an object of the present invention is to provide a fluid processing apparatus in which fluid is processed in an upstream-side processing space defined by at least two processing surfaces that rotate relative to each other, the fluid discharged from the upstream-side processing space is further performed fluid processing in a downstream-side processing space, wherein the downstream-side processing space is configured to function to control retention time of the fluid to be processed by using labyrinth seal, so that a reaction time is sufficiently ensured, and an intended reaction product can be obtained with a high efficiency.

Means for Solving the Problem

As for one example, an intended product X is obtained by reacting a raw material A and a raw material B by chemical reaction process. In this case, a first process of the fluid is mixing of the raw material A and the raw material B, and it is desired that the raw material A and the raw material B are mixed more uniformly and faster. Then, in a second process of the fluid, the reaction between the raw material A and the raw material B is allowed to proceed. In order to proceed the reaction, the reaction condition for efficiently obtaining the product X is adjusted. Illustrative examples of the reaction condition refer to concentrations of the raw material A and the raw material B, the temperature condition in the reaction field, the pressure condition and stirring condition, the presence/absence of the catalyst and its optimization, and the reaction time. Therefore, the highly efficient, continuous, low cost, and simple processing apparatus must be able to process each of the process efficiently (the first process and the second process of the fluid).

The fluid processing apparatus according to the present invention is configured such that the apparatus is provided with an upstream-side processing part defined by at least two processing surfaces that rotate relative to each other and a downstream-side processing part that is arranged in the downstream-side of the upstream-side processing part, the upstream-side processing part passes the fluid to be processed into an upstream-side processing space defined by the at least two processing surfaces, whereby an upstream-side processing is performed to the fluid to be processed. The raw material A and the raw material B are included in the fluid to be processed. The fluid to be processed passing through the upstream-side processing space is a forced fluid forced by the at least two processing surfaces, and when the forced fluid is a thin film fluid, the diffusion efficiency of the substances in the thin film fluid (raw material A and row material B) is very high, the substances are instantly diffused and mixed.

In the fluid processing apparatus used of the present invention, the downstream-side processing part is provided with a downstream-side processing space which functions to retain and stir the fluid to be processed by a labyrinth seal; and an upstream-side outflow port of the fluid to be processed from the upstream-side processing part is open to the downstream-side processing space, and the downstream-side processing space is configured to perform a function of controlling retention time by using the labyrinth seal.

This apparatus may be carried out in a way such that the downstream-side processing space is provided with a narrow seal space and a retention space that is arranged in the upstream side of the seal space and is wider than the seal space. This apparatus may be carried out in such a way that the seal space can be adjusted.

This apparatus may be carried out in such a way that the upstream-side outflow port is open to the retention space.

Further, this apparatus may be carried out in such a way that a plurality of the pairs of the seal space and the retention space are continuously arranged from an upstream to a downstream of the flow of the fluid to be processed.

This apparatus may be carried out in such a way that the downstream-side processing part comprises a cylindrical receiving part which defines the downstream side processing space and a column part which is received by the cylindrical receiving part, these parts defining the downstream-side processing space, by rotating at least any one of the cylindrical receiving part and the column part, the cylindrical receiving part and the column part relatively rotate. The rotation of at least any one of the cylindrical receiving part and the column part may be carried out independently of the rotation of the processing surface of the upstream-side processing part, or the rotation of at least any one of the cylindrical receiving part and the column part may be performed integrally with the rotation of the processing surface of the upstream-side processing part.

This apparatus may be carried out in such a way that the at least two processing surfaces are disk-like processing surfaces arranged so as to be apart from each other in an axial direction of rotation of the processing surfaces, the upstream-side processing part is configured such that a fluid to be processed is passed through the upstream-side processing space with a center side of the rotation of the processing surfaces as an upstream and an outer circumferential side of the rotation as a downstream, thereby discharging the fluid from the upstream-side outflow port in the outer circumferential end of the upstream-side processing space; the downstream-side processing part is provided with an annular receiving space in the outer circumferential side of the upstream-side outflow port, and the receiving space is the most upstream space in the downstream-side processing space and is the space wider than the seal space.

This apparatus may be carried out in such a way that a temperature adjusting mechanism may be installed for a purpose of controlling a temperature of the fluid to be processed in the downstream-side processing space, and a plurality of the temperature adjusting mechanisms may be installed and each of them may be adjusted to different temperatures.

In this apparatus, a distance between the at least two processing surfaces is mechanically set. The apparatus is installed with a clearance measurement sensor to measure the clearance and a clearance adjustment mechanism that automatically moves one processing surface of the at least two processing surfaces based on the measurement result of the clearance measurement sensor, the position of the one processing surface is variable.

This apparatus may be installed with a microwave irradiating mechanism to the fluid to be processed in the downstream-side processing space. Further, this apparatus may be installed with a pressure adjusting mechanism for the purpose of controlling a pressure of the fluid to be processed in the downstream-side processing space.

This apparatus may be provided with an introduction part in the downstream-side processing space to introduce a fluid to be processed other than the fluid to be processed from the upstream-side processing part. In addition, this apparatus may be provided with a discharge port in the downstream-side processing space to discharge a gas that is generated due to the upstream-side processing and/or the downstream-side processing performed in the downstream-side processing part. Further in addition, this apparatus may be provided with a plurality of discharge ports in the downstream-side processing part for the purpose of enabling discharge of the fluid to be processed in the downstream-side processing space for each retention time.

This apparatus may be carried out in such a way that the apparatus is configured such that the upstream-side processing in the upstream-side processing part is conducted to the fluid to be processed under a laminar flow condition, and the downstream-side processing in the downstream-side processing part is conducted to the fluid to be processed under non-laminar flow condition.

Further, the fluid processing apparatus according to the present invention may be carried out as the embodiments described below.

The fluid processing apparatus according to the present invention relates to the fluid processing apparatus which comprises an upstream-side processing part defined by at least two processing surfaces that is positioned in facing to each other so as to be able to approach to and separate from each other and relatively rotate and a downstream-side processing part that is arranged in a downstream side of the upstream-side processing part, the upstream-side processing part is carried out an upstream-side processing to a fluid to be processed by passing the fluid to be processed through an upstream-side processing space defined by the at least two processing surface. In the fluid processing apparatus of the present invention, the downstream-side processing part is provided with a downstream-side processing space connecting to the upstream-side processing space, and a part of a rotating member that rotates integrally with rotating processing surface of the upstream-side processing part constitutes a part of a wall surface that defines the downstream-side processing space. The downstream-side processing part is configured such that the downstream-side processing to the fluid to be processed is continuously carried out with the upstream-side processing by utilizing the rotation of the rotating member.

This apparatus may be carried out in such a way that the apparatus is configured to control the processing characteristics of the fluid to be processed with the downstream-side processing, outer circumferential side of the rotating member as an upstream and a center side of the rotation of the rotating member as a downstream. Further, this apparatus may be carried out in such a way that the apparatus is configured such that the downstream-side processing part comprises a cylindrical flow path extending in an axial direction of the rotation of the rotating member as at least a part of the downstream-side processing space, and in the cylindrical flow path, the processing characteristics of the fluid to be processed are controlled.

this apparatus may be carried out in such a way that the downstream-side processing part is configured to control a retention by means of a centrifugal force.

This apparatus may be carried out in such a way that the rotating member that rotates integrally with the rotating processing surface is a column part having a columnar shape as a whole, the rotating processing surface is arranged on one upstream-side end surface of the column part, the column part is arranged inside a cylindrical receiving part having a cylindrical shape as a whole, the downstream-side processing space is the space that is defined by at least any one of inner surfaces of the downstream-side end surface and an outer circumferential surface of the column part and at least any one of outer surfaces of a downstream-side end surface and an inner circumferential surface in the cylindrical receiving part, at least any one of the inner surface and the outer surface that define the downstream-side processing space is provided with concave and convex for fluid processing, and the downstream-side processing is conducted by the interaction between the concave and convex for fluid processing and the wall surface that is in a position facing to the concave and convex.

This apparatus may be installed with a position adjusting mechanism in which a position of a part of the wall surface that defines the downstream-side processing space is variable in order to control the retention time of the fluid to be processed in the downstream-side processing space.

This apparatus may be carried out in such a way that the apparatus is configured such that the upstream-side processing part is provided with at least two processing members arranged to be opposite to each other so as to be able to approach to and separate from each other, at least one of which rotates relative to the other and a plurality of the processing surfaces that are arranged in the position opposite to each other in each of the at least two processing members, one of the at least two processing members constitutes a part of the rotating member, the at least two processing surfaces is capable of approaching to and separating from in the axial direction of the rotation of the processing surface, the at least two processing surfaces define the upstream-side processing space that is an annular flow path through which the fluid to be processed is passed, the upstream-side processing to the fluid to be processed is conducted between the at least two processing surfaces by passing the fluid to be processed as a thin film fluid from the inside to the outside in a radial direction of the annular flow path, an upstream-side outflow port is arranged on the outer circumferential end of the annular flow path, and a distance between the processing surfaces is controlled by a balance between a force given to the at least two processing surfaces in an approaching direction thereof to the axial direction and a force given to the at least two processing surfaces in a separating direction to the axial direction, the fluid to be processed that is discharged from the upstream-side outflow port is released from a forced the force due to the processing surfaces, thereby discharging to the downstream-side processing space, and the fluid to be processed passes through the downstream-side processing space while being affected by the rotation of the rotating member.

This apparatus may be carried out in such a way that the upstream-side processing part comprises a first processing member and a second processing member, the first processing part constitutes a part of the rotation member, as the at least two processing surfaces, the first processing member is provided with the first processing surface and the second processing member is provided with the second processing surface, a casing to accommodate the first processing member is arranged outside the first processing member, the space between the outer circumferential surface of the first processing member and the inner circumferential surface of the casing and the space between the outer circumferential surface of the first processing member and the inner surface of the bottom part of the casing constitute at least a part of the downstream-side processing space, the downstream-side processing space is a flow path space in which the fluid to be processed discharged from the upstream-side processing space is retained.

The present invention to provide a fluid processing apparatus having a novel configuration, and the fluid processing apparatus is configured such that an intended reactant can be produced with a high yield as a result that a series of chemical reaction processing can be adjusted under the various reaction condition such as raw material concentration, temperature condition in the reaction field, pressure condition and stirring condition, presence/absence of catalyst and its optimization, and reaction time, especially the reaction time can be adjusted, by passing the fluid to be processed through into the upstream-side processing space defined by at least two processing surfaces that rotate to each other whereby fluid processing (upstream-side processing) is conducted to the fluid to be processed, and by opening an upstream-side outflow port which discharges the fluid to be processed being subjected to the upstream-side processing into a downstream-side processing space, and further conducting a fluid processing (downstream-side processing) to the fluid to be processed in the downstream-side processing space.

Especially, in this apparatus, the downstream-side processing space having the functions to retain and stir the fluid to be processed by the labyrinth seal is arranged in the downstream-side processing part, and the downstream-side processing is conducted to the fluid to be processed in the downstream-side processing space, whereby the retention time of the fluid to be processed in the downstream-side processing space could be controlled, and in particular, since the reaction time for continuation of the reaction and completion of the reaction in an organic reaction can be sufficiently ensured, the downstream-side processing to the fluid to be processed could be effectively conducted.

Figure 1:
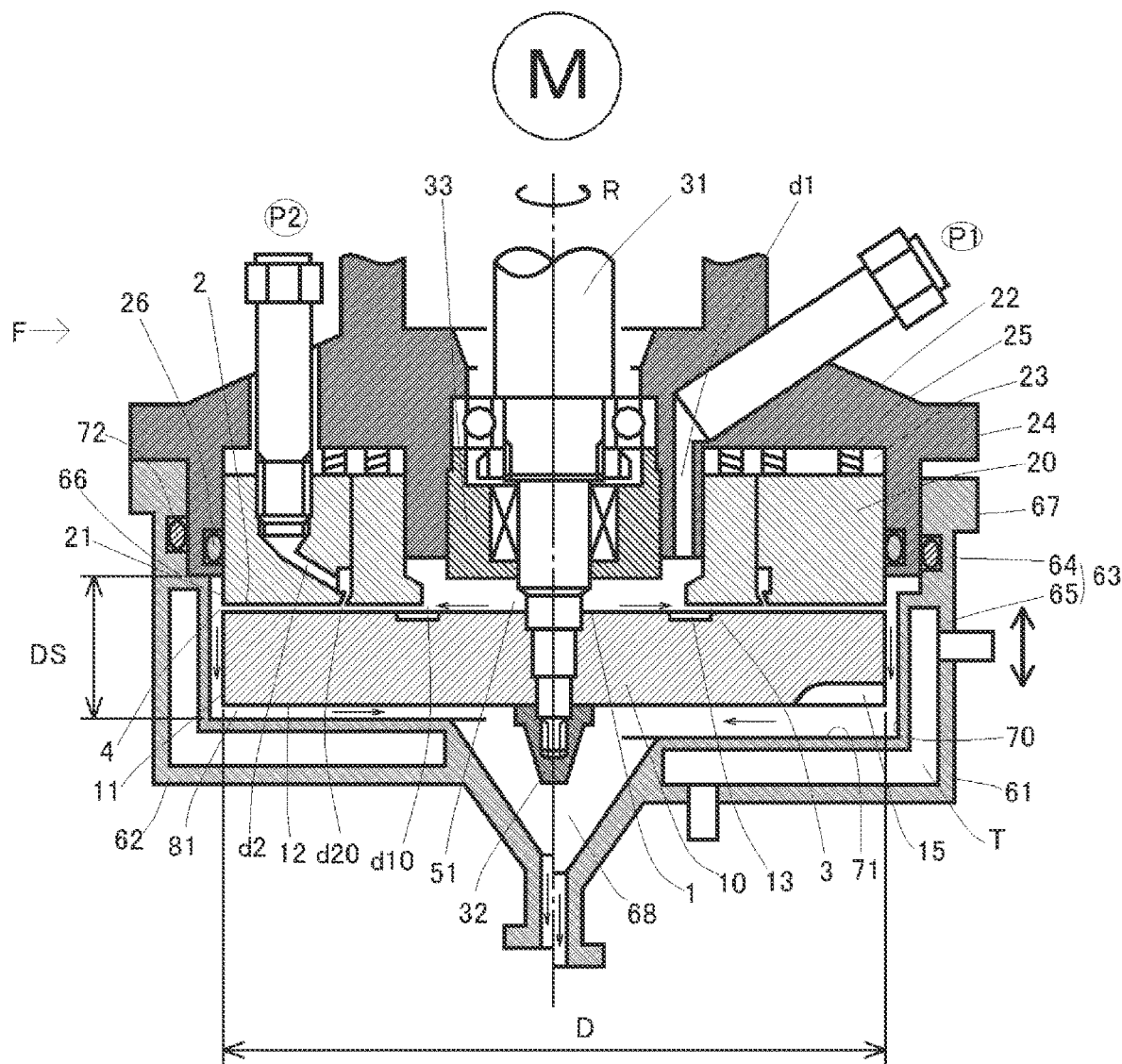
FIG. 1 This is a rough cross-section view of the fluid processing apparatus for embodiment of the present invention.

Beast Modes for Carrying Out the Invention

Hereinafter, embodiments according to the present invention will be described with referring to the drawings.

Fluid Processing Apparatus F

The fluid processing apparatus F according to the present invention will be described below with referring to FIG. 1 to FIG. 15.

The fluid processing apparatus F is configured such that an upstream-side processing part defined by at least two processing surfaces that rotate relative to each other and a downstream-side processing part arranged in a downstream side of the upstream-side processing part are provided, the upstream-side processing part passes a fluid to be processed through into an upstream-side processing space defined by the at least two processing surfaces, so that a upstream-side processing to the fluid to be processed is performed.

The part in which the fluid is processed in the upstream-side processing space in the fluid processing apparatus F is the same as the apparatus described in Patent Documents 3 to 5. Specifically, the fluid to be processed is processed in the upstream-side processing space defined by the at least two processing surfaces that rotate relative to each other. This apparatus is the apparatus in which of the fluids to be processed, a first fluid that is the first fluid to be processed is introduced into the upstream-side processing space, and of the fluids to be processed, a second fluid that is the second fluid to be processed is introduced into the upstream-side processing space from a different flow path that is independent of the flow path into which the first fluid is introduced and has an opening leading to the upstream-side processing space, whereby the first fluid and the second fluid are mixed in the upstream-side processing space to continuously perform the fluid processing. In other words, this apparatus is the apparatus that these fluids are merged to make a thin film fluid in the upstream-side processing space defined by disk-like processing surface that is arranged in a position opposite in an axial direction of rotation, and the fluids to be processed are processed in the thin film fluid thereby discharging the processed fluid from the upstream-side processing space. This apparatus is the most suitable for processing a plurality of the fluids to be processed, but this can also be used to carry out fluid-processing of a single fluid to be processed in the upstream-side processing space.

In FIG. 1, the upside and downside of the figure correspond to the upside and downside of the apparatus, but in the present invention, the up and down, right and left, and front and back merely indicate relative relationship of the positions, thus these do not identify the absolute positions. In FIG. 1, FIG. 2(A), and FIG. 3(B), "R" indicates the rotation direction. In FIG. 3(B), "C" indicates the centrifugal direction (radius direction). In the present invention, as a whole, the term "column" should not be interpreted as a mathematical column, this includes not only the column but also a hollow cylinder (hereinafter, cylinder) and a cylinder having a top.

The fluid processing apparatus F used in the present invention is different from the apparatus described in Patent Documents 3 to 5 in the point that the fluid is processed in the upstream-side processing space, and the downstream-side processing space is provided in the fluid processing apparatus F to further perform the fluid processing to the fluid which is subjected the fluid processing in the upstream-side processing space and is discharged from the upstream-side processing space. However, since it is important to explain the structure and action of the upstream-side processing space that is common with the apparatus described in the prior technological references in order to deepen the understanding of the present invention as the fluid processing apparatus, the part of the upstream-side processing space will be first explained.

Processing Surfaces

The fluid processing apparatus F comprises two processing members of a first processing member 10 and a second processing member 2 which are arrange in the position facing each other, at least one of which rotates to the other. The faces facing to each other in the processing members 10 and 20 constitute the respective processing surfaces. The first processing member 10 comprises the first processing surface 1 and the second processing member 20 comprises the second processing surface 2.

Both the processing surfaces 1 and 2 define the upstream-side processing part and the upstream-side processing space 3, and in the upstream-side processing space 3, the fluid processing of the fluid to be processed such as mixing is carried out. The upstream-side processing space 3 is a ring-like space which will be described later. The fluid processing performed in the upstream-side processing space 3 is called the upstream-side processing.

The distance between the processing surfaces 1 and 2 can be arbitrary changed, but in this embodiment, the distance is adjusted to a minute space of 1 mm or less, for example, in the range of about 0.1 μm to 50 μm. By so doing, the fluid to be processed passing through between the processing surfaces 1 and 2 becomes a forced thin film fluid forced by the fluid processing surfaces 1 and 2.

In the case that a plurality of fluids to be processed including the first fluid and the second fluid is processed by using the fluid processing apparatus F, the fluid processing apparatus F is connected to the flow path of the first fluid, and the first fluid is introduced from the upstream end of the upstream-side processing space 3 defined by the processing surfaces 1 and 2 (in this example, the inner side of the ring). At the same time, the upstream-side processing space 3 constitutes a part of the flow path of the second fluid that is different from the first fluid. Then, in the upstream-side processing space 3 between the processing surfaces 1 and 2, the fluids to be processed of the first fluid and the second fluid are mixed, and the fluid processing such as reacting is performed.

Specifically, the fluid processing apparatus F comprises a second holder 22 for holding the second processing member 20, a surface-approaching pressure imparting mechanism, a rotation drive mechanism, a first introduction part d1, a second introduction part d2, and a fluid pressure imparting mechanisms P1 and P2.

In this embodiment, the second processing member 20 is arranged above the first processing member 10, the lower surface of the second processing member 20 is the second processing surface 2, and the upper surface of the first processing member 10 is the first processing surface 1.

As shown in FIG. 1, in this embodiment, the first processing member 10 is a disk body not having an opening in the center thereof. The second processing member 20 is a circular body, more specifically a ring-like disk. In this embodiment, since the first processing surface 1 is disk-like shape and the second processing surface 2 is ring-like shape, the upstream-side processing space 3 defined by the processing surfaces 1 and 2 constitutes a ring-like space, namely, an annular flow path. The second processing member 20 may be a disk-like shape not having an opening in the center thereof, provided that the fluids to be processed including the first and second fluids can be introduced thereinto.

The first and second processing members 10 and 20 may be formed of a single member or a combination of plurality of members, and material of the processing members 10 and 20 is not only metal but also ceramics such as silicon carbide (SiC), sintered metal, abrasion-resistant steel, sapphire, other metal subjected to hardening treatment, and rigid material subjected to lining, coating, or plating. In this embodiment, at least part of the first and second processing surfaces 1 and 2 is mirror-polished.

Rotation of Processing Parts

Of the first processing member 10 and the second processing member 20, at least any one of the processing members rotates relative to the other by the rotation drive mechanism M such as an electric motor. The driving axis of the rotation drive mechanism M is connected to a rotation axis 31, in this example, the first processing member 10 attached to the rotation axis 31 rotates relative to the second processing member 20. In this embediment, the rotation axis 31 is fixed to the center of the first processing member 10 by a fixing tool 32 such as a screw, the rear end thereof is connected to the rotation axis of the rotation drive mechanism M, and driving force of the rotation drive mechanism M is transmitted to the first processing member 10 thereby rotating the first processing member 10, supporting part 33 for axially supporting the rotation axis 31 is provided at the center of the circular second holder 22. Needless to say, the second processing member 20 supported by the second holder 22 may be rotated, or both the processing members may be rotated.

Approach to and Separation from of Processing Surfaces

In this embodiment, at least any one of the first processing member 10 and the second processing member 20 can approach to and separate from each other in the axial direction of the rotation axis 31, so that the processing surfaces 1 and 2 may approach to and separate from each other.

In this embodiment, the first processing member 10 is fixed in the axial direction and is configured to rotate in the circumferential direction. The second processing member 20 approaches to and separates from the first processing member 10 in the axial direction, and the second processing member 20 is retractably accommodated in an accommodating part 23 that is provided in the second holder 22 by using a sealing mechanism such as an O-ring 26. The accommodating part 23 is a depression for accommodating the portion of the second processing member 20 that is mainly opposite to the second processing surface side in the axial direction, in plane-view, it forms a circle, that is, it is a groove formed in ring-like shape.

The second processing member 20 may be arranged in the accommodating part 23 of the second holder 22 so as to be movable only to parallel in the axial direction or may be accommodated in a state where the clearance is set to large or may be by a floating mechanism which holds the second processing member 20 in a three-dimensionally changeable manner.

Fluid Pressure Imparting Mechanism

The fluids to be processed (in this example, the first fluid and the second fluid) are supplied to the fluid processing apparatus F by the fluid pressure imparting mechanisms P1 and P2. Various types of pumps may be used for the pressure imparting mechanisms P1 and P2, and the fluids to be processed may be supplied to the fluid processing apparatus F at predetermined pressures. Further, in order to suppress the occurrence of pulsing during pumping, a pressure imparting apparatus equipped with a pressure container may also be used as the pressure imparting mechanisms P1 and P2. A gas for applying pressure is introduced into the pressure container that stores the fluids to be processed, and the fluid to be processed is pushed out by the pressure, whereby the fluids to be processed can be pumped.

Movement of Fluids to be Processed

The fluids to be processed are applied the pressure by the fluid pressure imparting mechanisms P1 and P2. Under the pressurized state, the fluids to be processed including the first fluid and the second fluid are introduced into between the processing surfaces 1 and 2 through the first introduction part d1 and the second introduction part d2.

In this embodiment, the first introduction part d1 is the flow path arranged in the circular second holder 22, and one end thereof is connected to the cylindrical introduction space 51. The introduction space 51 is the cylindrical space that is defined by among the lower surface of the supporting part 33, the lower surface of the inner circumferential side of the second holder 22, the inner circumferential surface of the second processing member 20, and the first processing surface 1.

The second introduction part d2 is the flow path arranged inside the second processing member 20, and the one end thereof is open to the second processing surface 2, and the opening serves as a direct introduction opening port (second introduction port d20) to the upstream-side processing space 3.

The first fluid is introduced from the first introduction part d1 into the upstream-side processing space 3 by way of the introduction space 51 from the upstream end of the upstream-side processing space 3, the end being a clearance between the processing parts 10 and 20 in the inner surface sides thereof. This clearance serves as the first introduction port d10. The first fluid introduced from the first introduction port d10 into the upstream-side processing space 3 becomes a thin film fluid between the first processing surface 1 and the second processing surface 2, and then passes through outside of both the processing members 10 and 20. In these between the processing surfaces 1 and 2, the second fluid pressurized to the predetermined pressure is supplied from the second introduction port d20 and is merged with the first fluid which serves as the thin film fluid, and as the upstream-side processing, a reaction processing is performed mainly while or after mixing by molecular dispersion. As the upstream-side processing, only mixing mainly by molecular dispersion may be conducted. This reaction process may be accompanied by crystallization, precipitation, separation, or the like, or may be not.

After the upstream-side processing is subjected, the thin film fluid formed by the first fluid and the second fluid is discharged from the processing surfaces 1 and 2 (in this example, between the outer circumferential end and the outer circumferential end of the processing surfaces 1 and 2, namely, the downstream end of the upstream-side processing space 3) to the outside of the processing members 10 and 20. since the downstream end of the upstream-side processing space 3 is an outlet of the upstream-side processing space 3, hereinafter this downstream end of the upstream-side processing space 3 is also called a upstream-side outflow port 4. The fluid discharged from the processing surfaces 1 and 2 to outside of the processing members 10 and 20 is received by an outer casing 61 that is arranged outside the first processing member 10, and the fluid processing is efficiently subjected to the fluid which is performed the upstream-side processing, and then the fluid is discharged to outside of the system (outside of the apparatus). The fluid discharged from the processing surfaces 1 and 2 to outside of the processing members 10 and 20 is released from the force given by the processing surfaces 1 and 2 and is discharged to a wider flow space (the downstream-side processing space 81).

since the first processing member 10 rotates, the fluid to be processed in the upstream-side processing space 3 does not move linearly from the inside to the outside, but this moves almost spirally from the inside to the outside due to a synthetic vector of the moving vector in the radial direction of the ring and the moving vector in the circumferential direction acting on the fluid to be processed.

In the motion of fluid, a dimensionless number representing the ratio of an inertial force and a viscous force is called Reynolds number and is expressed by the following formula (1).

$$\text{Reynolds number } Re = \text{inertial force/viscous force} = \rho VL/\mu = VL/\nu \quad \text{Formula (1)}$$

Here, $\nu=\mu/\rho$ is dynamic viscosity, V is a representative velocity, L is a representative length, $\rho$ is a representative viscosity, and $\mu$ is a representative viscosity. Here, taking the critical Reynolds number as the boundary, the flow of a fluid is a laminar flow below the critical Reynolds number, and is a turbulent flow when equal to or above the critical Reynolds number.

The distance between the processing surfaces 1 and 2 of the fluid processing apparatus F is usually adjusted to a minute clearance of 1 mm or less, for example in the range of about 0.1 to about 50 μm, thus, the amount of the fluid held between the processing surfaces 1 and 2 is extremely low. Therefore, the representative length L becomes very short, the centrifugal force of the thin film fluid passing through between the processing surfaces 1 and 2 is smell, and the effect of the viscous force becomes large in the thin film fluid. Accordingly, the Reynolds number decreases, and the thin film fluid becomes a laminar flow.

The centrifugal force is one kind of the inertial forces in the rotary motion, which is the force from the center to outer direction. The centrifugal force is expressed by the following formula (2).

$$\text{Centrifugal force } F = ma = mv^2/R \quad \text{Formula (2)}$$

Here, "a" represents acceleration, "m" represents mass, "v" represents velocity, and "R" represents radius.

As mentioned above, since the amount of the fluid held between the processing surfaces 1 and 2 is low, the ratio of the velocity to the mass of the fluid becomes very large and its mass becomes negligible. Accordingly, in the thin film fluid formed between the processing surfaces 1 and 2, the effect of gravity can be ignored.

Balance of the Forces

Next, the surface-approaching pressure imparting mechanism for imparting the force to the processing member exerting in the direction of approaching the first processing surface and the second processing surface 2 each other will be explained. In this embodiment, the surface-approaching pressure imparting mechanism is arranged in the second holder 22 and biases the second processing member 20 toward the first processing member 10. The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. By the balance between the surface-approaching pressure and the force to separate the processing surfaces 1 and 2 from each other due to the fluid pressure imparting mechanisms P1 and P2, i.e., the force such as the fluid pressure, the mechanism generates a thin film fluid having minute thickness of 1 mm or less in the level of nm or μm. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 23 and the second processing member 20. Specifically, the surface-approaching pressure imparting mechanism is composed of a spring 25 to bias the second processing member 20 toward the first processing member 10 and a biasing-fluid introduction part (not shown in Figure) to introduce a biasing fluid such as air and oil, wherein the surface-approaching pressure is provided by the spring 25 and the fluid pressure of the biasing fluid. The surface-approaching pressure may be provided by any one of this spring 25 and the fluid pressure of this biasing fluid; and other forces such as magnetic force and gravitation may also be used.

The second processing member 20 recedes from the first processing member 10 thereby making a minute space between the processing surfaces by separating force, caused by viscosity and the pressure of the fluid to be processed applied by the fluid pressure imparting mechanisms P1 and P2, against the bias of this surface-approaching pressure imparting mechanism. By this balance between the surface-approaching pressure and the separating force as mentioned above, the first processing surface 1 and the second processing surface 2 can be set with the precision of a micrometer level; and thus, the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part, and spring force when the spring 25 works as a pulling spring. This surface-approaching pressure imparting mechanism may be arranged in the first processing member 10 not in the second processing member 20, or may be arranged in both.

At least any one of the first and second processing members 10 and 20 may be installed a temperature adjusting mechanism to adjust the temperature thereof by cooling or heating. Alternatively, the fluids to be processed introduced from the first introduction part d1 and the second introduction part d2 into the fluid processing apparatus F may be cooled or heated to adjust the temperatures thereof. The temperature energy possessed of the fluid to be processed may also be used for separation of fine particles in the case of a reaction accompanied with separation.

Depression and Micro-Pump Effect

Figure 2:
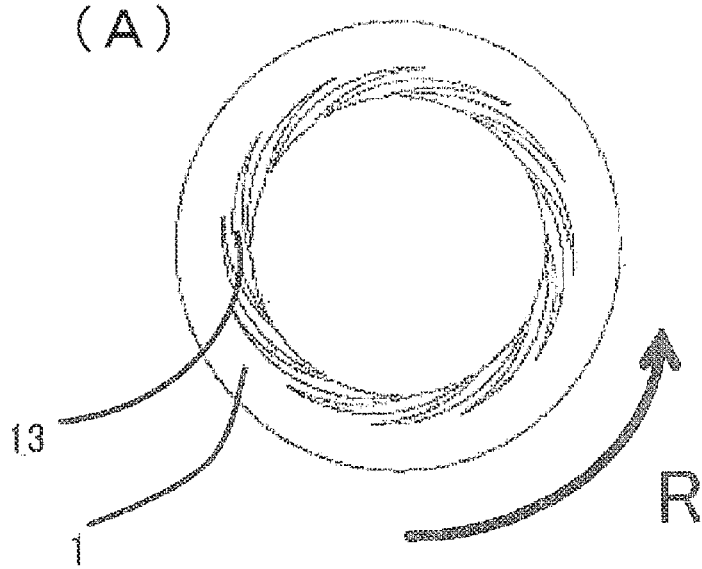
FIG. 2(A) is a rough plane view of the first processing surface of the fluid processing apparatus shown in FIG. 1.
FIG. 2(B) is an enlarged view of the essential part of the processing surface of the apparatus.
Figure 2:
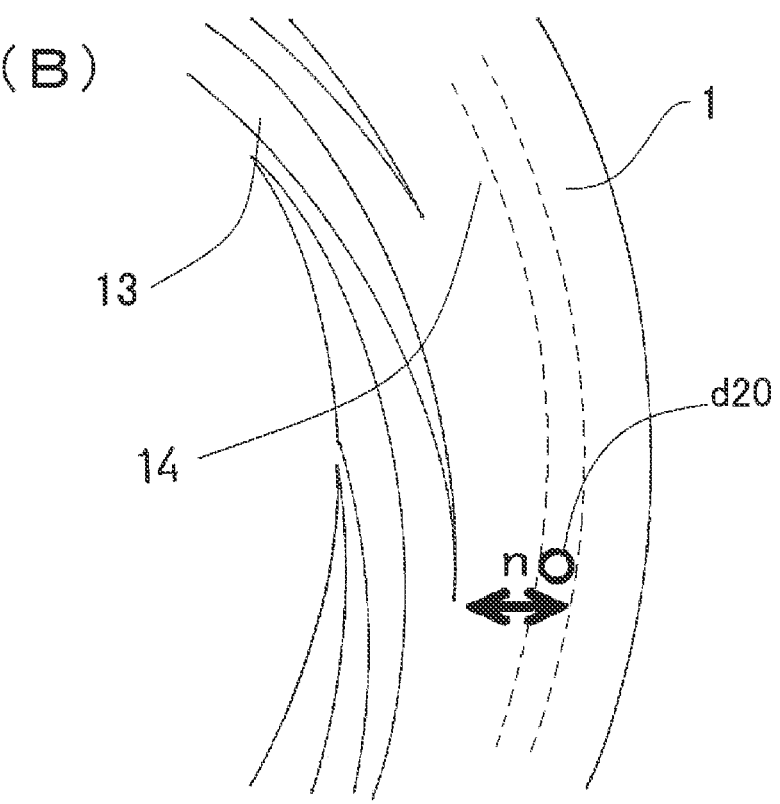
Figure 3:
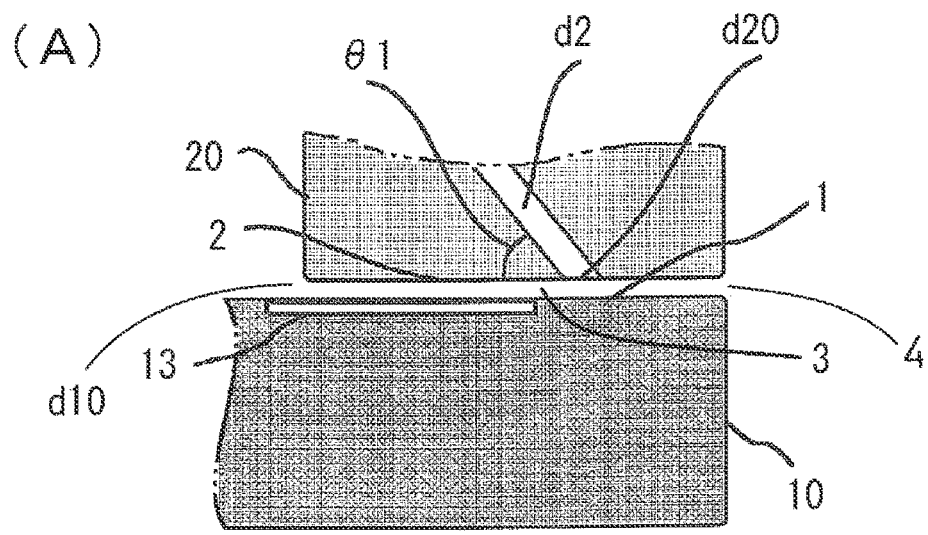
FIG. 3(A) is a cross-section view of the second introduction part of the apparatus.
FIG. 3(B) is an enlarged view of the essential part of the processing surface for explanation of the second introduction part.
Figure 3:
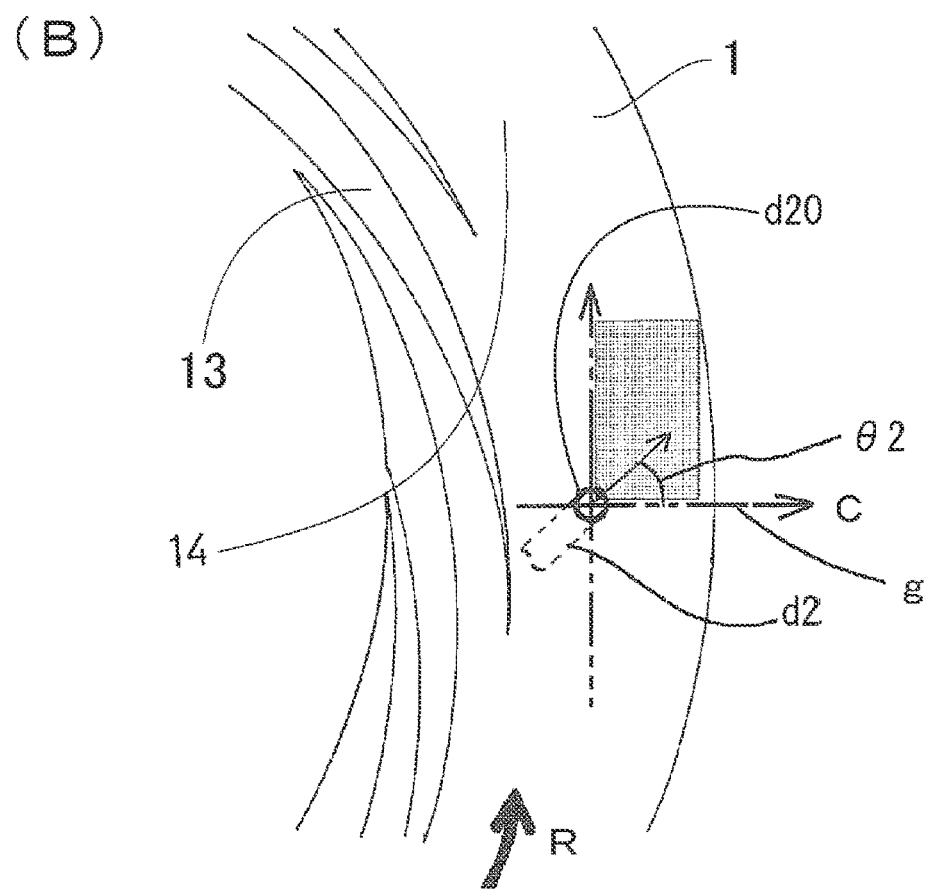

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

When the depression 13 is provided on the first processing surface 1, it is preferable that the base end of the depression 13 reach the introduction space 51. The front end of the depression 13 extends toward the outer circumferential direction of the first processing member 10, and the depth thereof (cross-section area) may be gradually decreased as going from the base end toward the front end thereof.

Between the front end of the depression 13 and the outer circumferential surface 11 of the first processing member 10, a flat surface 14 not having the depression 13 is provided.

Rotation Speed and Fluid Processing

When the second introduction port d20 of the second introduction part d2 is arranged in the second processing surface 2, it is preferable to provide in the position facing the flat surface 14 of the first processing surface 1.

This second introduction port d20 is arranged preferably in the downstream (outside in this case) of the depression 13 of the first processing surface 1. The second introduction port d20 is arranged especially preferably at a position opposite to the flat surface 14 located nearer to the outer diameter than a position where the direction of flow upon introduction of the first fluid by the micro-pump effect into the upstream-side processing space is changed to the direction of a spiral and laminar flow formed between the processing surfaces. Specifically, in FIG. 2(B), a distance n from the outermost side of the depression 13 arranged in the first processing surface 1 in the radius direction is preferably about 0.5 mm or more. Especially in the case of separating fine particles from a fluid, it is preferable that mixing of a plurality of fluids to be processed due to the molecular dispersion as well as reaction and separation of the fine particles therefrom be effected under the condition of a laminar flow.

In order to carry out the processing of the fluids to be processed under the laminar flow condition, the circumferential velocity in the outer circumference of the first processing member 10 is suitable for in the range of 0.3 to 35 m/sec.

Second Introduction Part

The shape of the second introduction port d20 may be, as shown in FIG. 1, a continuous opening having a shape such as a concentric circular ring-shape surrounding the central opening of the second processing surface 2 that is a ring-like disk or as shown in FIG. 2(B) and FIG. 3(B), may be an independent opening having a shape such as a circular. In the case that the shape of the second introduction port d20 is the circular ring-shaped, the opening of the circular ring-shaped may be continuous over the entire circumference or may be partially discontinuous.

When the circular ring-shaped second introduction port d20 is arranged in concentrically surround the central opening of the second processing surface 2, the second fluid can be processed under the same condition in the circumferential direction upon introduction this into the upstream-side processing space 3, thus, when producing the mass production of an intended product, it is preferable that the shape of the opening be a concentric circular ring-shape.

This second introduction part d2 may have directionality. For example, as shown in FIG. 3(A), the direction of introduction from the second introduction port d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), in the case that the second introduction port is an independent opening hole, this may have directionality in a plane along the second processing surface 2. The direction of introduction of this second fluid is in the outward direction departing from the center in a radial component of the processing surface and in the forward direction in a rotation component of the fluid between the relatively rotating processing surfaces. In other words, a predetermined angle ($\theta 2$) exists facing the rotation direction R from a reference line g, which is the line to the outward direction and in the radius direction passing through the second introduction port d20. This angle (θ2) is also set preferably at more than 0° and less than 90°.

Kinds of Fluid to be Processed and Number of the Flow Path

In the embodiment shown in FIG. 1, kinds of the fluid to be processed and numbers of the flow path thereof are set two respectively; but they may be one, or three or more. In the embodiment shown in FIG. 1, the second fluid is introduced into the upstream-side processing space 3 from the second introduction part d2; but this introduction part may be arranged in the first processing member 10 or in both. Alternatively, a plurality of introduction parts may be arranged relative to one fluid to be processed. Each production port is not particularly restricted in its form, size, and number; and these may be changed as appropriate. Further, the introduction port may be arranged immediately before between the first and second processing surfaces 1 and 2, or even in the upstream side thereof. The expression "first" or "second" for each fluid has a meaning for merely discriminating an $n^{th}$ fluid among a plurality of the fluids present; and therefore, a third or more fluids can also exist. In FIG. 6 to FIG. 8 and FIG. 10, the third introduction part d3 and its opening d30, which are the flow path of the third fluid as the third fluid to be processed, are shown. The third introduction part d3 is a flow path arranged inside the second processing member 20, as in the case of the second introduction part d2, and one end thereof is open at the second processing surface 2, and the introduction port thereof (third introduction port d30) is located in the second processing surface 2 in the downstream side of the second introduction port d20 of the second introduction part d2. In FIG. 6 to FIG. 8 and FIG. 10, the first introduction part d1 is omitted in order to avoid complicating the drawings. Regarding this point, it can be considered as the cross-section views at the position where the first introduction part d1 is not arranged. Each flow path is tightly sealed by liquid-tight (when the fluid to be processed is a liquid) or by airtight (when the fluid to be processed is a gas).

Downstream-Side Processing

Next, the fluid processing (downstream-side processing) in a downstream-side processing space 81, which is the essential part of the present invention, will be described.

The fluid processing apparatus F comprises the downstream-side processing part arranged on the downstream side of the upstream-side processing part, and the downstream-side processing part is provided with the downstream-side processing space 81. DS region where the downstream-side processing space 81 is arranged is illustratively shown in FIG. 1 and FIG. 12.

In the fluid processing apparatus F of the present invention, the upstream-side processing is carried out in the upstream-side processing space 3, and the downstream-side processing space 81 is provided for further performing the fluid processing to the fluid discharged from the downstream end of the upstream-side processing space 3 (the fluid in which the upstream-side processing is performed). The fluid processing performed in the downstream-side processing space 81 is referred to as downstream-side processing.

Outer Casing

An outer casing 61 is provided on the outside of the rotating first processing member 10 to accommodate the first processing member 10. The outer casing 61 receives the fluid discharged from the upstream-side outflow port 4. In this embodiment, the outer casing 61 accommodates the first processing member 10 and a part of the second processing member 20, the fluid flowed out from the upstream-side outflow port 4 of the first processing member 10 is subjected to the downstream-side processing in the downstream-side processing space 81 between the inner surface of the outer casing 61 and the outer surface of the first processing member 10.

In this embodiment, as shown in FIG. 1, the outer casing 61 may constitutes the cylindrical receiving part having a cylindrical shape as a whole and having a bottom part as necessary. The outer casing 61 may not be movable in an axial direction (upward and downward directions in the figure), though in this embodiment, the outer casing is provided so as to be movable in upward and downward directions. As a result, the distance between the bottom part of the first processing member (outer end surface 12 of the first processing member 10) and the bottom part 62 of the outer casing 61 (inner surface 71 of the bottom part 62) can be adjusted. In FIG. 1, a state in which the outer casing 61 is raised is illustrated on the left side of the center line, and the state in which the outer casing 61 is lowered is illustrated on the right side of the center line.

The configuration for upward and downward movement can be variously changed, but to show an example of a structure suitable for this, the outer casing 61 comprises the bottom part 62 and a circumferential wall part 63 extending upward from circumference of the bottom part 62, and in the upper end of the circumferential wall part 63, a flange 67 protruding outward in radius direction from the circumferential wall part 63 is formed over the entire circumference. In this embodiment, the circumferential wall part 63 comprises a thin wall part 64 where the thickness of the wall is thin, a thick wall part 65 where the thickness of the wall is thick, and a boundary part 66 that is a boundary between the thin wall part 64 and the thick wall part 65, the outflow part 68 is provided in the center of the bottom part 62. In this embodiment, the circumferential wall part 63 is configured to have the thin wall part 64 and the thick wall part 65; but the thickness of the circumferential wall part 63 may be constant. The flange 67 may be formed only partially in the circumferential direction, or the flange 67 may not be provided on the outer casing 61. The outflow part 68 is a discharge port to discharge the fluid flowing through the downstream-side processing space 81 to the outside of the system (outside of the apparatus).

The outer casing 61 is attached to the second holder 22, and the first processing member 10 and the second processing member 20 are accommodated in the outer casing 61. As shown in FIG. 1, the second holder 22 is provided with protruding part 24 that protrudes outward in a radius direction from the outer circumferential surface of the second holder 22. When the outer circumferential surface of the second holder 22 and the inner circumferential surface of the thin wall part 64 in the outer casing 61 are brought into close contact and the lower surface of the protruding part 24 and the upper surface of the flange 67 are assembled so as to abut to each other, a step part 66 of the outer casing 61 abuts to the bottom surface of the second holder 22 in the outer circumferential side. Then, by using a fitting tool such as a bolt or a sealing mechanism such as an O-ring 72, the outer casing 61 is liquid-tightly and airtightly attached to the second holder 22, and the first processing member 10 and second the processing member 20 are accommodated in the outer casing 61. If the fluid discharged from the processing surfaces 1 and 2 to the outside of both the processing members 10 and 20, that is, the fluid discharged from the upstream-side outflow port 4, can be received by the outer casing 61, a part of the outer circumferential surface of the second holder 22 is assembled so as to be close contact with a part of the inner circumferential surface of the thin wall part 64, whereby the outer casing 61 may be liquid-tightly and airtightly attached to the second holder 22.

Downstream-Side Processing Space

As described above, by attaching the outer casing 61 to the second holder 22, the downstream-side processing space 81 can be arranged (a) between the outer circumferential surfaces 11 and 21 of the first and second processing members 10 and 20 and an inner circumferential surface 70 of the circumferential wall 63 (thick wall part 65) in the outer casing 61 and (b) between the outer end surface 12 of the first processing member 10 and the inner surface 71 of the bottom part 62 of the outer casing 61. Here, the outer end surface 12 of the first processing member 10 is the lower surface of the first processing member 10 (in other words, the surface opposite to the first processing surface 1 in an axial direction).

In this embodiment, the first processing member 10 that rotates integrally with the rotating first processing surface 1 is the rotating member, and the outer circumferential 11 and the outer end surface 12 of the first processing member 10 constitute a part of the wall part that constitutes the downstream-side processing space 81. In other words, the first processing member 10 constitutes the column part having a columnar shape, as a whole, and the space between the outer surface thereof and the inner surface of the outer casing 61 constitutes the downstream-side processing space 81, and the downstream-side processing is performed between the outer surface and the inner surface.

The upstream-side outflow port 4 is open into the downstream-side processing space 81, and the downstream-side processing space 81 can receive and retain the fluid discharged from the processing surfaces 1 and 2 to outside of both the processing members 10 and 20. By such a configuration, the downstream-side processing part having the downstream-side processing space 81 is arranged on the downstream side of the first and second processing surfaces 1 and 2 that define the upstream-side processing part, the upstream-side processing space 4 and the downstream-side processing space 81 are connected, whereby the downstream-side processing can be continuously carried out with the upstream-side processing.

Further, by utilizing the rotation of the first processing member 10 which is the rotation member, the downstream-side processing can be performed. The downstream-side processing is the fluid processing performed in the downstream-side processing space 81, which is the reaction processing after the upstream-side processing is performed and is a process of obtaining a reaction product by advancing the reaction. Mixing by molecular dispersion is mainly completed in the upstream processing in the upstream-processing space 4, but the following processing can be performed as the downstream-side processing. Illustrative example thereof can include such as retention of fluid, stirring of fluid, mixing of fluid, heat treatment, pH adjustment, ageing. For example, in the case of an organic reaction, the reaction may be completed by retention treatment, or upon the reaction, a stirring processing may be performed additionally.

The clearance of the downstream-side processing space 81 is depended on the retention time of the fluid in the downstream-side processing space 81, but it is preferably in the range of 2 to 30% relative to the outer diameter D of the first processing member 10, and it is more preferably in the range of 3 to 20% relative to the outer diameter D of the first processing member 10. For example, when the outer diameter of the first processing member 10 is set to 100 mm, the clearance of the downstream-side processing space 81 is preferably in the range of 2 to 30 mm, more preferably in the range of 3 to 20 mm. Here, the outer diameter D of the first processing member 10 is the diameter of the first processing member 10 not including a protruding part 16 to be mentioned later.

Figure 4:
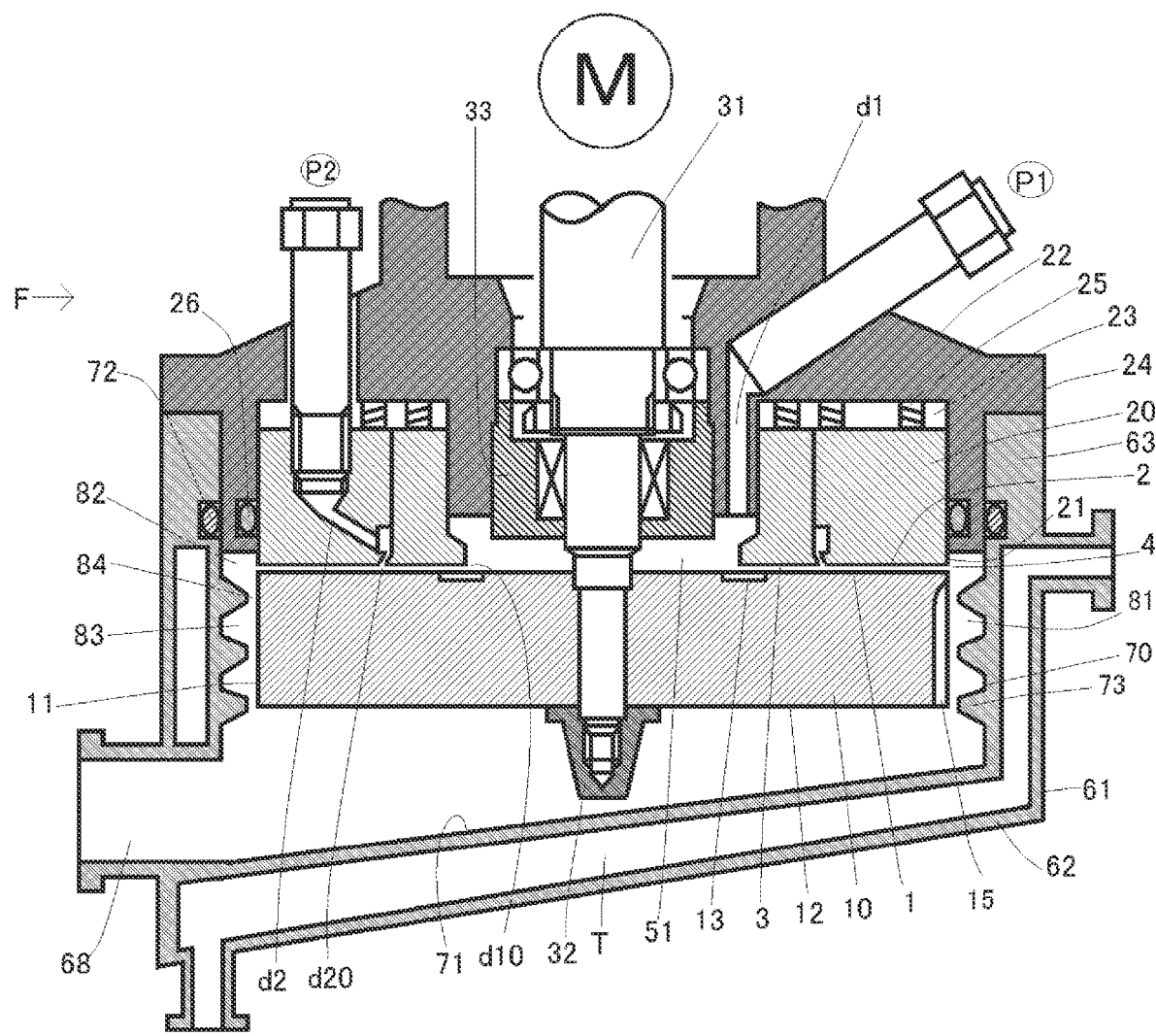
FIG. 4 This is a rough cross-section view of the fluid processing apparatus according to another embodiment of the present invention.
Figure 10:
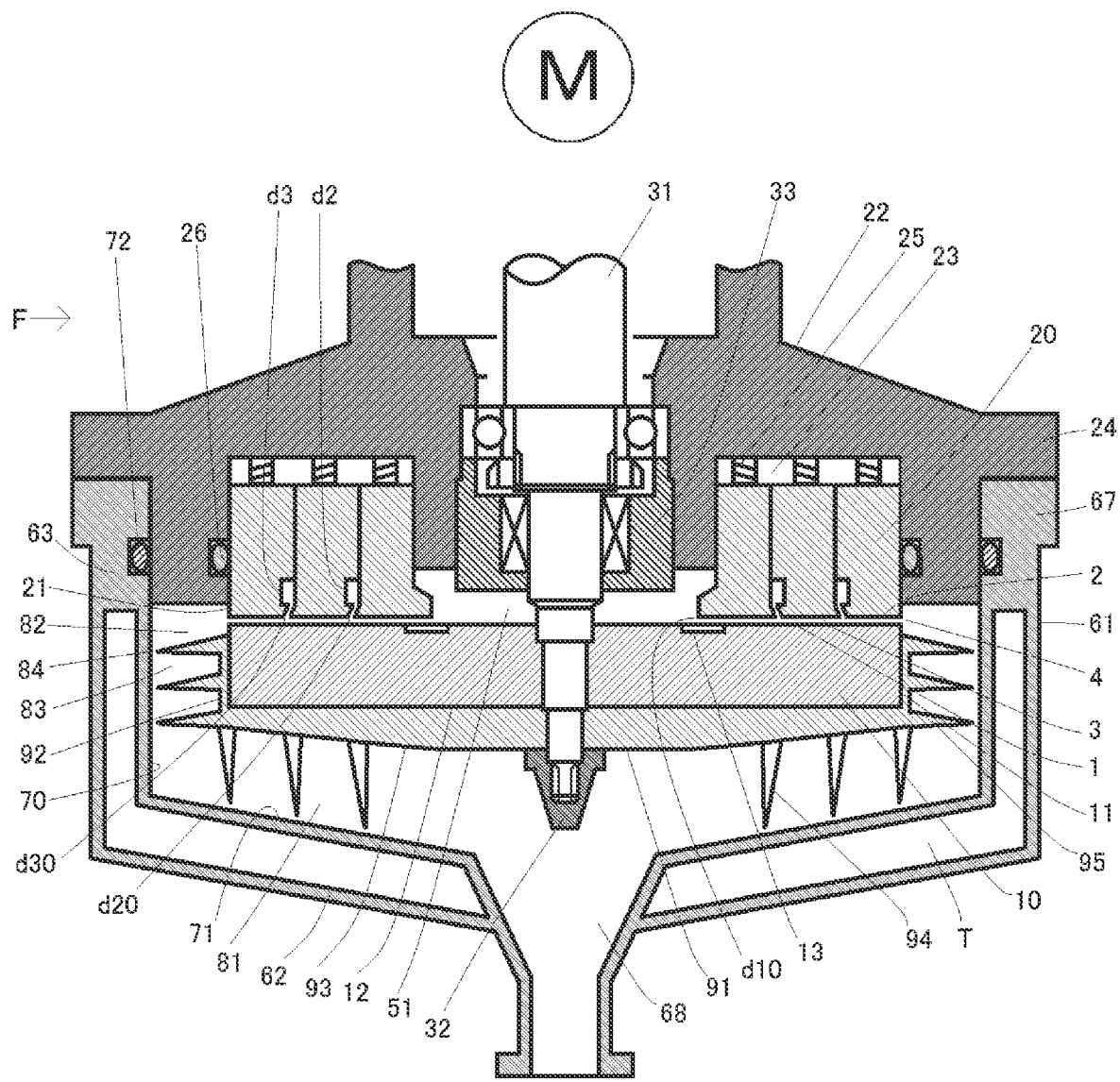
FIG. 10 This is a rough cross-section view of the fluid processing apparatus according to still another embodiment of the present invention.

The shape of the outer casing 61 is not particularly restricted so far as the condition that includes the part being performed the downstream-side processing between the outer casing 61 and the first processing member 10, and for example, as shown in FIG. 10, the bottom part 62 may be funnel shape having the conical shape whose diameter gradually decreases, and outflow part may be provided at the lower end of this funnel shape, or as shown in FIG. 4, the bottom part 62 of the outer casing 61 may be inclined toward the outflow part 68 arranged in the circumferential wall part 63.

Outflow Part

The outflow part 68 is not limited to the one that is open to the bottom part 62, and may be, for example, one that is open to the circumferential wall part 63. Further, a plurality of the outflow parts 68 may be provided, and by providing the plurality of the outflow parts 68, it makes possible to allow the inflow and outflow of the fluid to flow in accordance with the retention time of the fluid in the downstream-side processing space 81.

Separate Introduction Part

Figure 12:
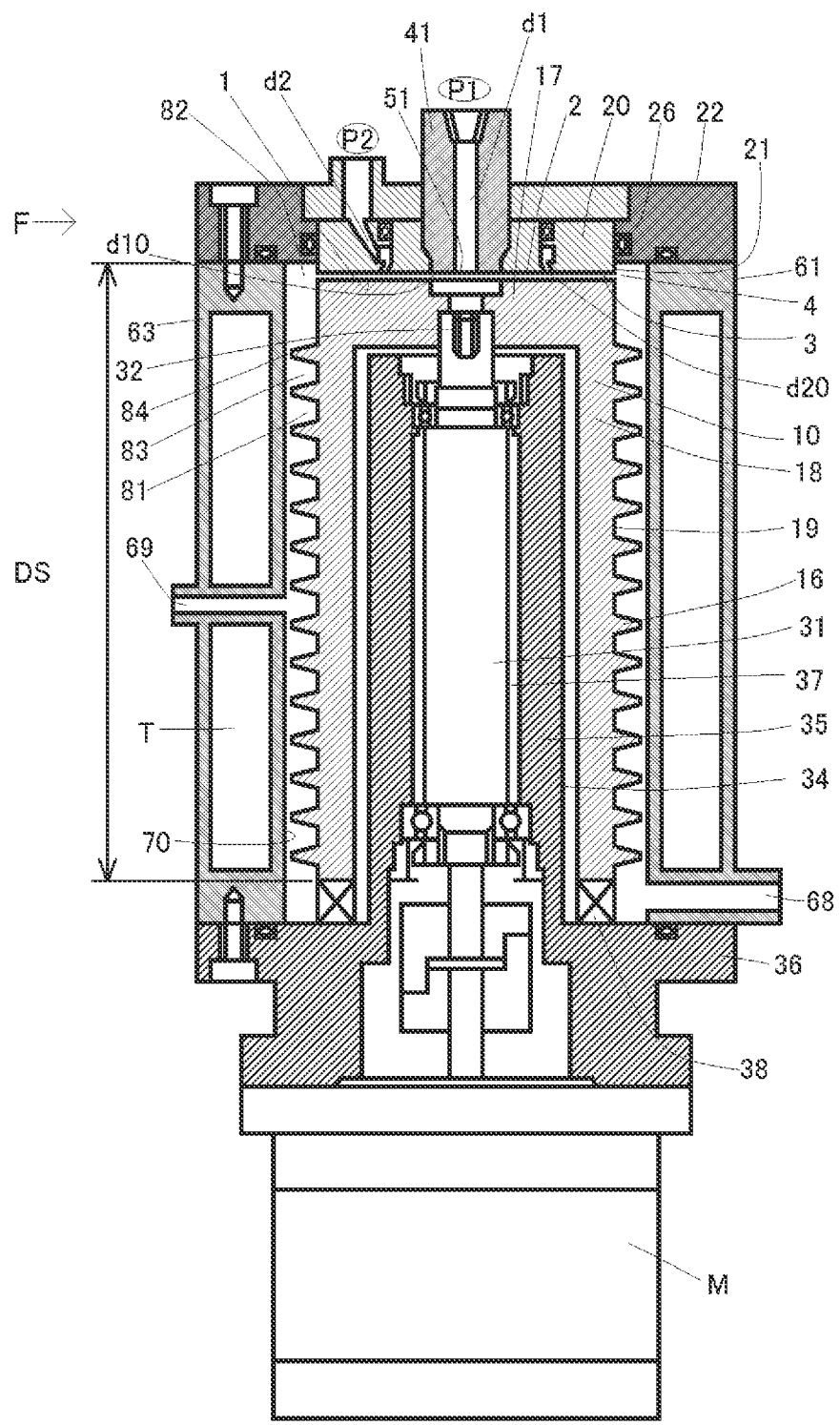
FIG. 12 This is a rough cross-section view of the fluid processing apparatus according to still another embodiment of the present invention.

In addition, as can be seen in the embodiment shown by FIG. 12, an introducing device (not shown) for supplying the fluid to the downstream-side processing space 81 may be provided, and an introduction part 69 may be arranged in the outer casing 61. As illustrative examples of the substance contained in the fluid supplied to the downstream-side processing space 81 from the introduction part 69 include a raw material itself, a polymerization initiator, a reaction terminating agent, a pH adjusting agent, a catalyst, and a coating agent and the like.

Casing Movability

The outer casing 61 may be provided so as to be movable in upward and downward directions (axial direction of rotation) by means of an attachment position adjustment mechanism (not shown). By providing the outer casing 61 so as to be movable in an upward and a downward direction (axial direction of rotation), the volume of the downstream-side processing space 81 can be increased and decreased, thus the retention time of the fluid in the downstream-side processing space 81 can be controlled. The specific configuration of the attachment position adjustment mechanism is not particularly restricted, any linearly sending means such as a sending mechanism by a screw, a fluid pressure driving mechanism such as air, oil pressure, or the like may be employed by appropriately selecting them.

Concave and Convex for Stirring

The downstream-side processing space 81 may be provided with concave and convex for stirring to have a stirring function to the fluid. For example, A stirring blade may be provided on the outer circumferential surface 11 of the first processing member 10 and the outer end surface 12 of the first processing parts 10. When the outer circumferential surface 11 of the first processing member 10 and the outer end surface 12 of the first processing parts 10 are provided with the stirring blade, the fluid being subjected to the upstream-side processing can be stirred by the stirring blade by utilizing the rotation of the rotation axis 31. The stirring blade may be implemented in various shapes capable of applying a shear force to the fluid discharged from the processing surfaces 1 and 2 to the outside of both the processing members 10 and 20; and for example, the blade may be a plate-like blade, a screw-type blade, or a blade processed to concave shape. The shape of the stirring blade is optimally selected in accordance with the discharge amount (flow amount from the outflow part 68) and shear force for the processing purpose.

Figure 11:
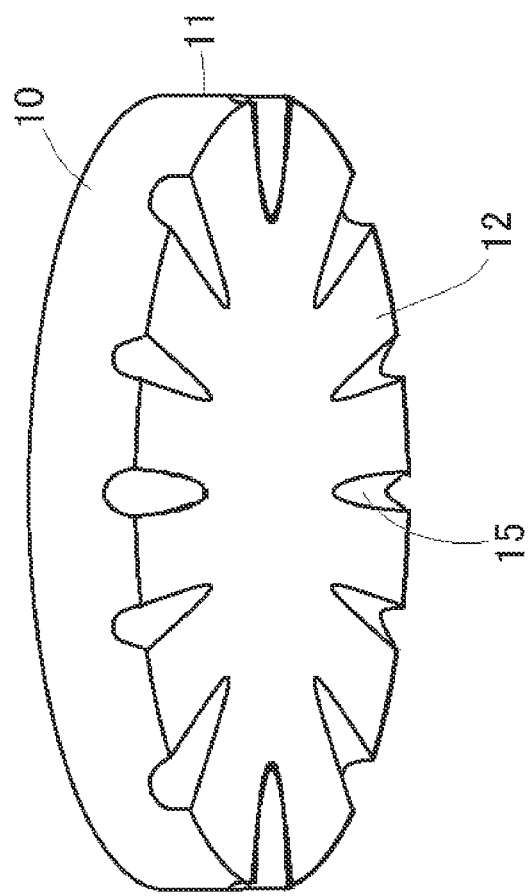
FIG. 11 This is a perspective view of the first processing part in the fluid processing apparatus that is shown in FIG. 1 from a lower side.

As an illustrative example thereof, as shown in the half cross-section view of FIG. 1 at right side and FIG. 11, the outer end surface 12 of the first processing member 10 is provided with a plurality of groove-like depressions 15 extending from the outer side in the radius direction to the inner side thereof. When the first processing member 10 rotates in the comparatively narrow limited space between the column part having columnar shape as a whole (specifically, the first processing member 10) and the cylindrical receiving part having cylindrical shape as a whole (specifically, the outer casing 61), the depression 15 serves as the stirring blade, and the fluid around the depression 15 is discharged to outside of the first processing member 10, so that the fluid is stirred. The fluid discharged to outside of the first processing member 10 collides with and bounces back from the inner circumferential surface 70 of the circumferential wall part 63 of the outer casing 61 and the inner surface 71 of the bottom part 62 whereby the stirring action is further facilitated. As shown in FIG. 4, the depression 15 may be provided on the outer circumferential surface 11 of the first processing member 10.

Labyrinth Seal Mechanism

In the wall parts that constitute the downstream-side processing space 81 such as the outer circumferential surface 11 and the outer end surface 12 of the first processing member 10, and the inner circumferential surface 70 of the circumferential wall part 63 and the inner surface 71 of the bottom part 62 in the outer casing 61, the labyrinth seal mechanism may be provided to extend the retention time of the fluid in the downstream-side processing space 81. The labyrinth seal is a seal that provides resistance to flow of the fluid while maintaining the clearance in the radius direction or in the axial direction and minimizes leakage, and a maze formed by the peripheral part of knife-like structure and contact points causes expansion of the fluid passing through one after another.

As one example of the protruding part to perform the labyrinth mechanism, as shown in FIG. 4, the embodiment provided with the protruding part 73 which protrudes toward the downstream-side processing space 81 from the inner circumferential surface 70 of the circumferential wall part 63 of the outer casing 61 in a radius inner side direction may be mentioned. The protruding part 73 has a circular shape in a plan view, and one or plurality of the protruding part 73 may be arranged concentrically.

In this embodiment, the protruding part 73 is tapered from the base end to the front end thereof. There is a minute clearance of about 0.01 to 1 mm between the front end of the protruding part 73 and the outer circumferential surface 11 of the first processing member 10, depending on the viscosity of the processed substance. Further, the bottom part 62 of the outer casing 61 may be inclined toward the outflow part 68 arranged in the circumferential wall part 63.

Figure 5:
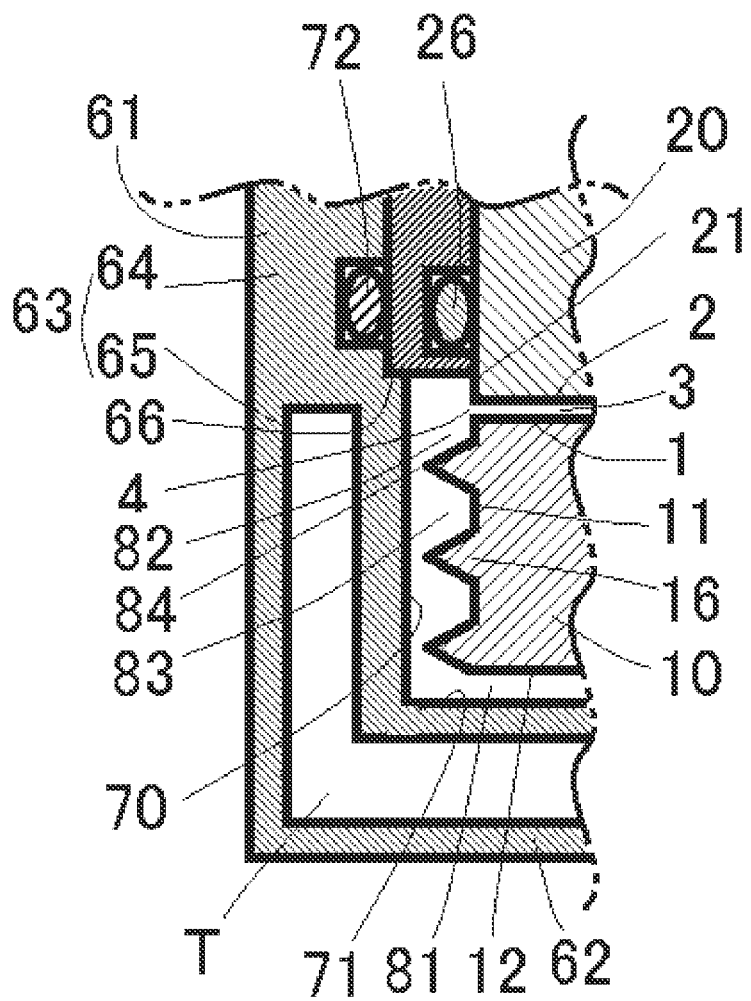
FIG. 5 This is an explanatory drawing of the essential part of the fluid processing apparatus according to still another embodiment of the present invention.

In another embodiment, as shown in FIG. 5, the embodiment provided with a plurality of the protruding parts 16 that protrude toward the downstream-side processing space 81 from the outer circumferential surface 11 of the first processing member 10 in a radius outside direction may be mentioned. In this embodiment, the protruding part 16 is tapered from the base end to the front end thereof. A minute clearance in the range of about 0.01 to 1 mm is provided between the front end of the protruding part 16 and the inner circumferential surface 70 of the circumferential wall part 63 (the thick wall part 65) of the outer casing 61.

By setting such a minute clearance, the fluid becomes laminar flows when passing through the minute clearance and becomes difficult to pass through. As a result, it takes a time to pass through this minute clearance, and the fluid retains in a comparatively large space in the upstream side of this minute clearance.

In other words, it can be said that the labyrinth seal mechanism applied to the present invention is not a seal mechanism that completely prevents the leakage but is the mechanism that gradually leaks the fluid to the downstream side while retaining the fluid in the space on the upstream-side thereof.

The first processing member 10 may not necessarily be composed of one member but may be integrally assembled a plurality of members. In this way, the concave and convex are readily processed and formed on the first processing member 10 having a columnar shape as a whole by the plurality of the members.

Figure 6:
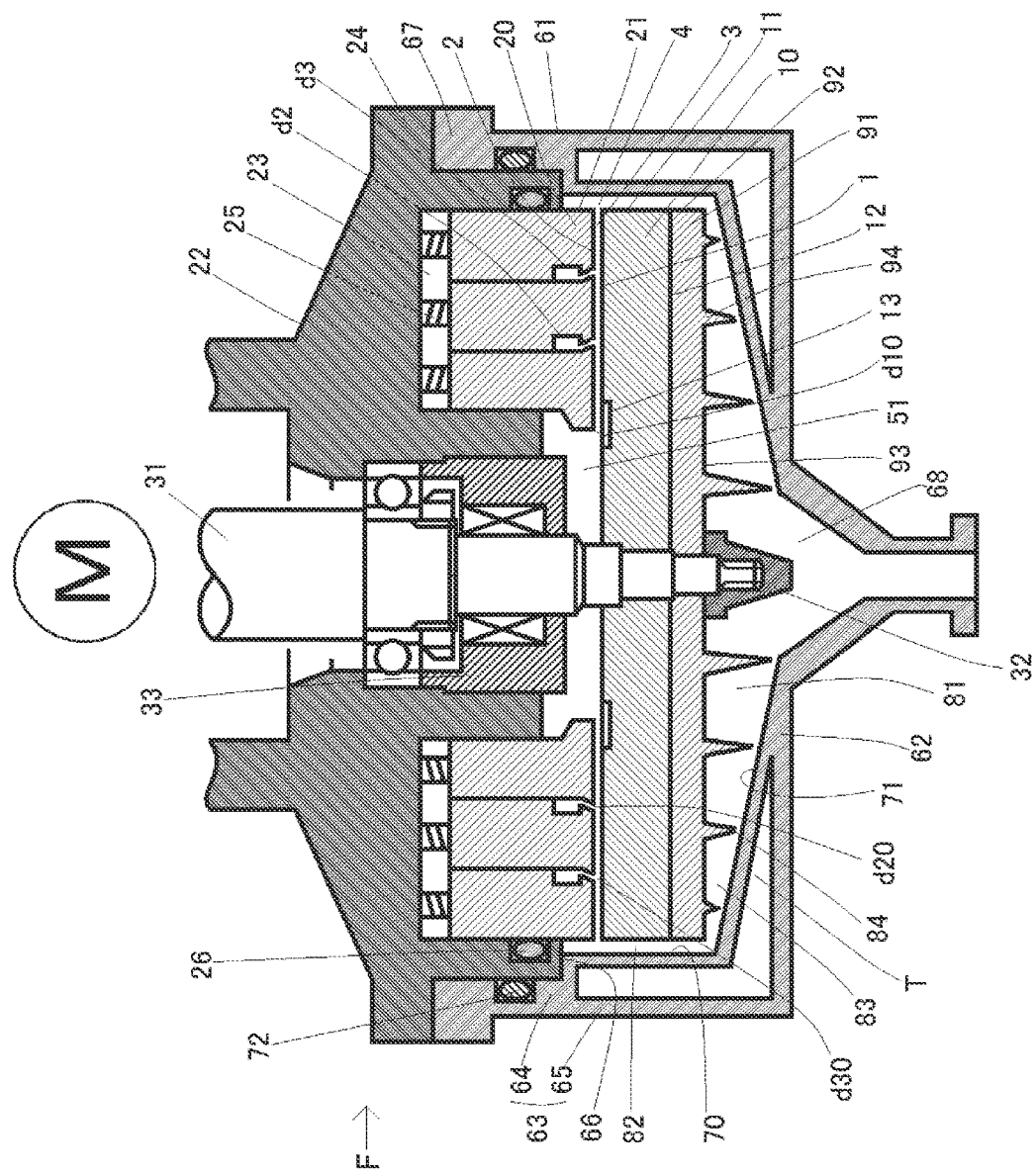
FIG. 6 This is a rough cross-section view of the fluid processing apparatus according to still another embodiment of the present invention.

Specifically, as still another embodiment, the one shown in FIG. 6 may be mentioned. This embodiment provided that the outer end surface 12 of the first processing member 10 is provided with a bottom member 91, and a plurality of protruding parts 94 protruding downward from lower surface 93 of the bottom member 91 toward the downstream-side processing space 81 may be mentioned. The bottom member 91 is attached to the first processing member 10 so as to rotate in the same body as the first processing member 10. In this embodiment, the plurality of the protruding parts 94 are inclined from the base end to the front end thereof. A minute clearance in the range of about 0.01 to 1 mm is formed between the front end of the protruding parts 94 and the inner surface 71 of the bottom part 62 of the outer casing 61. In this embodiment, the downstream-side processing space 81 may be provided (a) between the outer circumferential surfaces 11, 21, and 92 of the first and second processing surfaces 10 and 20 and the bottom member 91 and the inner circumferential surface 70 of the circumferential wall part 63 (thick wall part 65) of the outer casing 61, and (b) between the lower surface 93 of the bottom member 91 and the inner surface 71 of the bottom part 62 of the outer casing 61. In this embodiment, the first processing member 10 and the bottom member 91 are the rotating member, and the outer circumferential surface 11 of the first processing member 10, and the outer circumferential surface 92 and the lower surface 93 of the bottom member 91 constitute a part of the wall part that constitutes the downstream-side processing space 81. In this embodiment, the bottom member 91 is prepared as a separate part from the first processing member 10, then although this is attached to the first processing member 10 so as to rotate in the same body as the first processing member 10, the bottom member 91 may be formed as a completely same body with the first processing member 10 such as by directly processing the first processing member 10 to form the bottom member 91. Further, as shown in FIG. 6, the inner surface 71 of the bottom part 62 of the outer casing 61 may be a funnel shape having the conical shape such that the depth of the downstream-side processing space 81 become deeper from the outer side in the radius direction to inner side.

Figure 7:
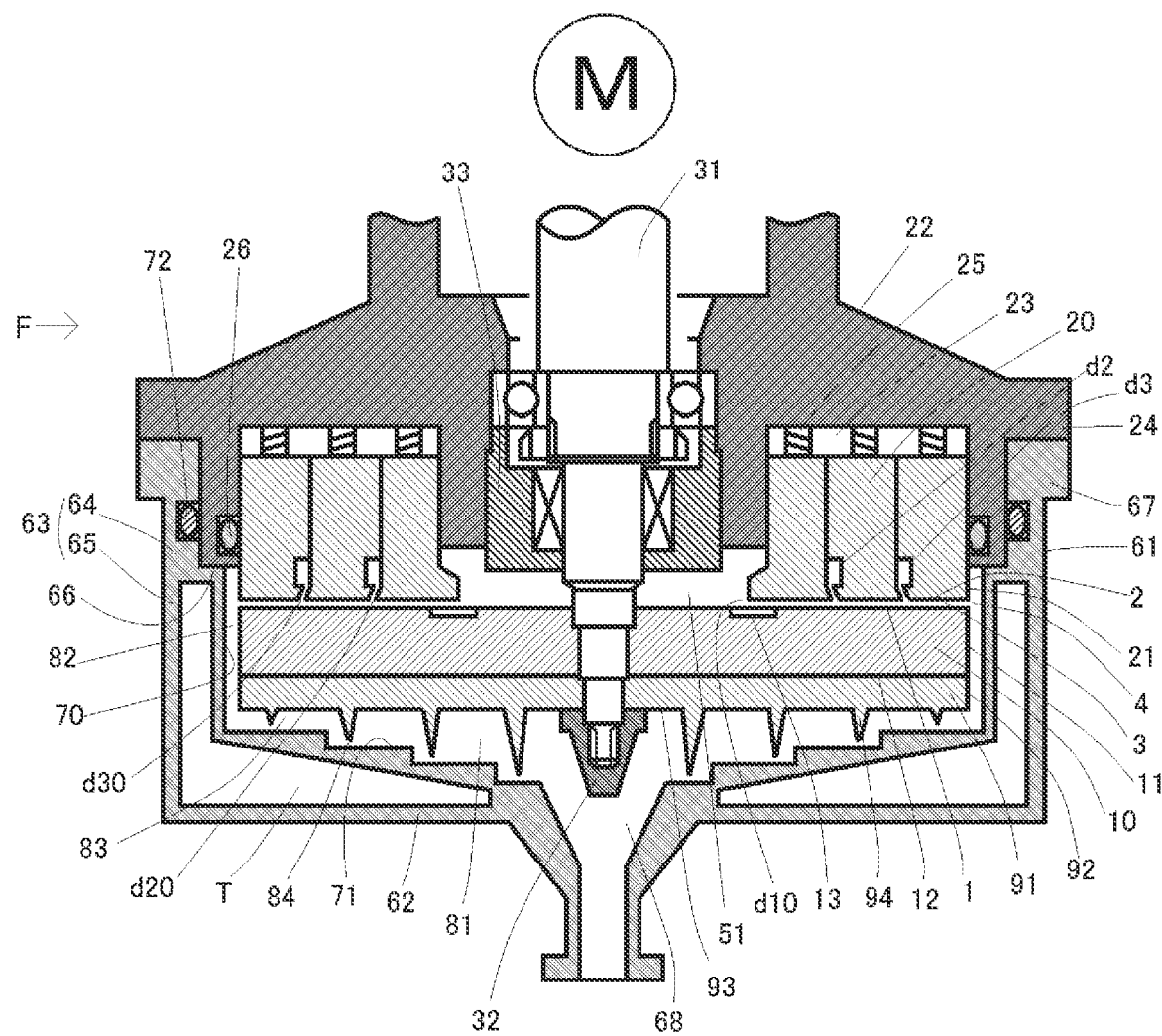
FIG. 7 This is a rough cross-section view of the fluid processing apparatus according to still another embodiment of the present invention.

In still another embodiment, as shown in FIG. 7, in addition to the plurality of the protruding parts 94, steps may be provided on the inner surface 71 of the bottom part 62 of the outer casing 61 such that the depth of the downstream-side processing space 81 become deeper from the outside in the radius direction to inside. A minute clearance in the range of about 0.01 to 1 mm is formed between the front end of the protruding parts 94 and the inner surface 71 of the bottom part 62 of the outer casing 61.

In still another embodiment, as shown in FIG. 10, the embodiment provided that the bottom member 91 which is configured to mostly cover the outer end surface 12 of the first processing member 10 and the outer circumferential surface 11 of the first processing member 10, and a plurality of the protruding parts 94 protruding downward from the lower surface 93 of the bottom member 91 to the downstream-side processing space 81, and a plurality of protruding parts 95 protruding outward in radius direction from the outer circumferential surface 92 of the bottom member 91 to the downstream-side processing space 81 may be mentioned. The bottom member 91 is attached to the first processing member 10 so as to rotate in the same body as the first processing member 10. In this embodiment, the plurality of the protruding parts 94 and 95 are inclined from the base end to the front end thereof. A minute clearance in the range of about 0.01 to 1 mm is formed between the front end of the protruding parts 95 and the inner circumferential surface 70 of the circumferential wall part 63 of the outer casing 61, and further a minute clearance in the range of about 0.01 to 1 mm is formed between the front end of the protruding parts 94 and the inner surface 71 of the bottom part 62 of the outer casing 61. In this embodiment, the first processing member 10 and the bottom member 91 are the column part having a columnar shape as a whole, and the space with the cylindrical receiving part (outer casing 61) that receives the column part constitutes the downstream-side processing space 81.

The outer circumferential surface 11 of the first processing member 10 and the outer circumferential surface 92 and the lower surface 93 of the bottom member 91 constitute a part of the wall part that constitutes the downstream-side processing space 81.

Here, the specific configuration and function of the labyrinth seal mechanism will be described with referring to FIG. 5.

The downstream-side processing space 81 comprises seal part 84 and pool part 83. The seal part 84 is a narrow space formed between the front end of the protruding part 16 and the inner circumferential surface 70 of the circumferential wall part 63 (thick wall part 65) of the outer casing 61, the pool part 83 is a space formed between the outer circumferential surface 11 of the first processing member 10 not having the protruding part 16 and the inner circumferential surface 70 of the circumferential wall part 63 (thick wall part 65) of the outer casing 61, and the pool part 83 is arranged in the upstream side of the seal part 84 and is a wider space than the seal part 84.

The seal part 84 and the pool part 83 may be one pair, but it is preferable that a plurality of the pairs be continuously arranged from the upstream to downstream of the fluid flow.

The downstream-side processing space 81 comprises a receiving part 82 in the outer circumferential side of the upstream-side outflow port 4. The receiving part 82 is a space in the most upstream of the downstream-side processing space 81 and is a wider space than the seal part 84, this can receive the fluid discharged from the upstream-side outflow port 4 that is open into the downstream-side processing space 81 without resistance. The receiving part 82 may also serve as the pool part 83 that is arranged in the most upstream of the fluid flow.

The fluid discharged from the upstream-side outflow port 4 is firstly received by and stored in the receiving part 82. When the receiving part 82 is filled with the fluid, the fluid leaks to the seal part 84 arranged in the downstream side of the receiving part 82. When the seal part 84 is filled with the fluid, the fluid leaks to the pool part 83 arranged in the downstream side of the seal part 84. The fluid is received by and stored in the pool part 83. When the pool part 83 is filled with the fluid, the fluid leaks to the seal part 84 arranged in the downstream side of the pool part 83. In the downstream-side processing space 81, plurality of sets of the seal part 84 and the pool part 83 are continuously arranged, therefore movements of these fluids are repeated.

On the other hand, the first processing member 10 having the protruding part 16 on the outer circumferential surface 11 thereof rotates. When the spaces of the receiving part 82, the seal part 84, and the pool part 83 are filled with the fluid respectively, the centrifugal force acts due to the rotation of the first processing member 10, therefore for example, the fluid in the receiving part 82 is difficult to leak out to the seal part 84 arranged in the downstream side of the receiving part 82. Especially in the seal part 84, which is a narrow space, due to the rotation of the first processing member 10, the fluid is difficult to leak out to the pool part 83 arranged in the downstream side of the seal part 84.

Accordingly, when the first processing member 10, which is the rotation member constituting a part of the wall part of the downstream-side processing space 81, is rotated, and a plurality of sets of the receiving part 82, the seal part 82 which is a narrow seal space, and the pool part 83 which is a retention space wider than the seal part are continuously arranged in the downstream-side processing space 81, the leaking amount of the fluid discharged from the upstream-side outflow port 4 to the downstream-side processing space 81 is minimized in the seal part 84, and the fluid leaked from the seal part 84 is filled and stored in the pool part 83 arranged in the downstream side of the seal part 84; as a result of the above, the retention time of the fluid in the downstream-side processing space 81 is extended due to the labyrinth seal.

Especially, by providing a plurality of sets of the pool part 83 and the seal part 84, the retention time of the fluid in the entire apparatus is leveled. For example, considering the case where the single part 83 files the total storing capacity of the fluid planned for the entire apparatus, even if the retention time of the fluid from the empty state of the single pool part 83 to the filled state thereof is constant, when a continuous operation is carried out after the pool part is filled, it is difficult to configure all the fluids that fill the single pool part 83 replacing with all of new fluids flowing in from the upstream, a part of the fluid flows out to the downstream before attaining the retention time, and the other part of the fluid retain in the pool part 83 indefinitely. Accordingly, the control of the retention time is more likely to be controlled by chance, as a result, a percentage of the fluid flowing out to downstream before attaining the planned determined retention time is also controlled by chance. On the other hand, when the plurality of sets of the pool part 83 and the seal part 84 are arranged, even if the retention time in the single pool part 83 is controlled by chance, by increasing the number of the sets, the retention times of each fluid are leveled, and it is advantageous in terms of a stable control of the retention time.

The retention time of the fluid in the downstream-side processing space 81 can be adjusted by adjusting the volume of the downstream-side processing space 81, the clearance and length of the downstream-side processing space 81, the number of sets of the seal part 84 and the pool part 83, the rotation number of the rotation member such as the first processing member 10 and the bottom member 91, and the introduction amount of the fluids (the first fluid and the second fluid) introduced into the fluid processing apparatus F. When it is desired to adjust the retention time while the fluid processing apparatus F is under operation, the rotation number of the rotation member such as the first processing member 10 and the bottom member 91 and the introduction amount of the fluids (the first fluid and the second fluid) that are introduced into the fluid processing apparatus F are adjusted. By adjusting these, the desired retention time is realized depending on the product.

The specific configuration and function of the labyrinth seal mechanism have been explained with referring to FIG. 5, however, in other embodiments, too, the functions of the rotation member (the first processing member 10 and the bottom member 91), the receiving part 82, the pool part 83, and the seal part 84 are the same as those of the above embodiment, and the same effect is obtained. The shapes of the protruding parts 16, 73, 94, and 95 may be any shape that can form the seal part 84, which is a narrow space between the front end thereof and the column (the first processing member 10 and the bottom member 91) or the cylindrical receiving part (outer casing 61). The length of the protruding part and the width of the front end of the protruding part may be arbitrarily set within a range necessary for obtaining labyrinth seal property.

The fluid that fills the narrow space of the seal part 84 becomes a laminar flow, so that the seal effect thereof can be enhanced. On the other hand, the fluid stored in the receiving part 82 and the pool part 83, which are comparatively wide spaces, becomes a turbulent flow, so that the stirring action is given to the fluid during its retention.

Next, with referring to FIG. 12 to FIG. 15, modification examples of the downstream-side processing part will be described. Hereinafter, the basic structure and action of the fluid processing apparatus F are the same as above, the explanation will be mainly given to the different points, with regard to the points not explained here, the explanation given to the previous embodiments shall be applied as it is. In any modification, too, the labyrinth seal mechanism is provided, and the function is exhibited.

The downstream-side processing part is provided with a cylindrical flow path extending in the axial direction of the rotation member in at least part of the downstream-side processing space 81, which is advantageous in allowing the reaction, which is the downstream-side processing, to proceed for long time.

FIG. 12 shows at least the first processing member 10 is extended long in the axial direction and the cylindrical flow path between an outer circumferential surface 19 and the inner circumferential surface 70 of the circumferential wall part 63 of the casing 61 is extended longer as compared with the previous embodiment.

In this embodiment, too, the first processing member 10 constitutes the column part. As shown in FIG. 12, the first processing member 10 comprises an upper part 17, the upper surface of which is the first processing surface 1.

Here, an extended part 18 extending long in the axial direction (downward direction in the figure) of the first processing member 10 is arranged, and in the outer circumferential surface 19, the protruding part 16 protruding outward in the radius direction to the downstream-side processing space 81 is provided. The protruding part 16 is tapered from the base end to the front end thereof.

The seal part is configured by having a minute clearance in the range of about 0.01 to 1 mm between the front end of the protruding part 16 and the inner circumferential surface 70 of the circumferential wall part 63 of the outer casing 61 described later. The comparatively large pool part 83 is formed on the upstream side of the seal part 84.

Rotation of the Processing Member

In this embodiment, the first processing member 10 attached to a rotation axis 31 rotates to the second processing member 20. Therefore, the first processing member 10 is the rotation member. The rotation axis 31 is arranged in a hollow cylinder that penetrates the first processing member 10 and is fixed to the center of the upper part 17 of the first processing member 10 by means of a fixing tool 32 such as a screw. The base end of the rotation axis 31 is connected to the driving axis of the rotation drive mechanism M, and the driving force of the rotation drive mechanism M is transmitted to the first processing member 10 to rotate the first processing member 10. In order to smoothly support this rotation, a rotation support part 34 is arranged in the outer circumference thereof, and the rotation axis 31 is rotatably supported on the front-end side and the base-end side.

Specifically, the rotation support part 34 comprises a columnar axis part 35 and a columnar base part 36 having a diameter larger than the columnar axis part 35 in the lower part of the axis part 35, and a through hole 37 in which the rotation axis 31 is mounted is provided in the center. The axis part 35 is arranged inside the extended part 18 of the first processing member 10, and the rotation axis 31 is mounted in the through hole 37 so that the rotation axis 31 is pivotally supported.

The distance between the processing surfaces 1 and 2 is preferably 1 mm or less in the case of separating superior nanoparticles for the same reasons as previously mentioned in the upstream-side processing part. However, in the case that the fluid processing such as an organic reaction is performed to not separate the nanoparticles, or in the case that the particle size is relatively large even though the fine particles are separated, the clearance may be adjusted to 5 mm or less, for example, in the range of about 1 μm to 5 mm. When the distance between the processing surfaces 1 and 2 is adjusted comparatively large, the adjustment thereof can be suitably carried out in the way other than setting of the clearance by the balance between the surface-approaching pressure and the separating force, and thus, a mechanical setting of the clearance can be carried out. Thus, it should be understood that even in all the embodiments described above, there is a case where the adjustment of the distance between the processing surfaces 1 and 2 can be carried out by the structure of the setting of the mechanical clearance.

In the setting of the mechanical clearance, the processing surfaces 1 and 2 can be implemented as having a fixed clearance, not approaching to and separating from.

Mechanical Clearance Adjustment Mechanism

As one example of the structure of the mechanical clearance setting, though not shown, the distance between the processing surfaces 1 and 2 is measured by a measurable sensor, and based on the measurement result, the second processing member 20 may be configured movable in the axial direction by means of the clearance adjustment mechanism. Specific configuration of the clearance adjustment mechanism is not particularly restricted, any linearly sending means such as a sending mechanism by a screw, a fluid pressure driving mechanism such as air, oil pressure, or the like may be employed by appropriately selecting them.

In this embodiment, the second processing member 20 is attached to the center of the circular second holder 22 by means of a seal mechanism such as the O-ring 26.

In this embodiment, the first introduction part d1 is a flow path that axially penetrates a central part 41 arranged in the center of the circular second processing member 20, and the downstream end thereof is connected to the introduction space 51. The introduction space 51 is a space defined by the lower surface of the center part 41 and the first processing surface 1.

In this embodiment, the shape of the outer casing 61 is cylindrical shape.

The outer casing 61 is attached to the second holder 22 and the rotation support part 34, and the first processing member 10 and the second processing member 20 are accommodated in the outer casing 61. First, the lower surface of the second holder 22 and the upper surface of the circumferential wall part 63 that constitutes the cylindrical shape of the outer casing 61 are fixed to each other by a fixing tool such as a bolt or a sealing mechanism such as an O-ring, by using them, the outer casing 61 is liquid-tightly and airtightly attached to the second holder 22. Next, the upper surface of the base part 36 of the rotation support part 34 and the lower surface of the outer casing 61 are fixed to each other by a fixing tool such as a bolt or a sealing mechanism such as an O-ring thereby liquid-tightly and air-tightly fixing the outer casing 61 to the rotation support part 34; and also, the lower surface of the extended part 18 of the first processing member 10 and the upper surface of the base part 36 are sealed by means of the seal member 38.

By attaching the outer casing 61 which is substantially cylindrical shape as a whole to the second holder 22 and the rotation support part 34, the downstream-side processing space 81 that is a cylindrical space can be provided (a) between the outer circumferential surface 21 of the second processing member 20 and the inner circumferential surface 70 of the circumferential wall part 63 of the outer casing 61, and (b) between the outer circumferential surface 19 of the extended part 18 of the first processing member 10 and the inner circumferential surface 70 of the circumferential wall part 63 of the outer casing 61. In this embodiment, the extended part 18 of the first processing member 10 becomes the column part, and the circumferential wall part 63 of the outer casing 61 becomes the cylindrical receiving part. The extended part 18 of the first processing member 10, which is column part, rotates to the circumferential wall part 63 of the outer casing 61; on the contrary to this, when the column part may be in the fixed state, the other cylindrical receiving part may rotate, or both may rotate, but in this case, it is required to rotate relative to each other.

The circumferential wall part 63 of the outer casing 61 is provided with the outflow part 68 and the introduction part 69. The introduction part 69 is to supply a fluid to the downstream-side processing space 81 from a flow path different from the flow path of the fluid that is supplied from the upstream-side outflow port 4 to the downstream-side processing space 81. The fluid from the introduction part 69 may be the same as or different from the fluid from the upstream-side outflow port 4 when comparing the fluid itself.

The introduction part 69 may be used as a discharge port to discharge a gas generated in the upstream-side processing and/or the downstream-side processing, or separate discharge port may be arranged. Accordingly, the fluid flowing out from the upstream-side outflow port 4 is discharged from the outflow part 68 while introducing a fluid and discharging a fluid such as a gas through the introduction part 69 as needed, whereby the downstream-side processing in the restricted downstream-side processing space 81 is completed.

Figure 13:
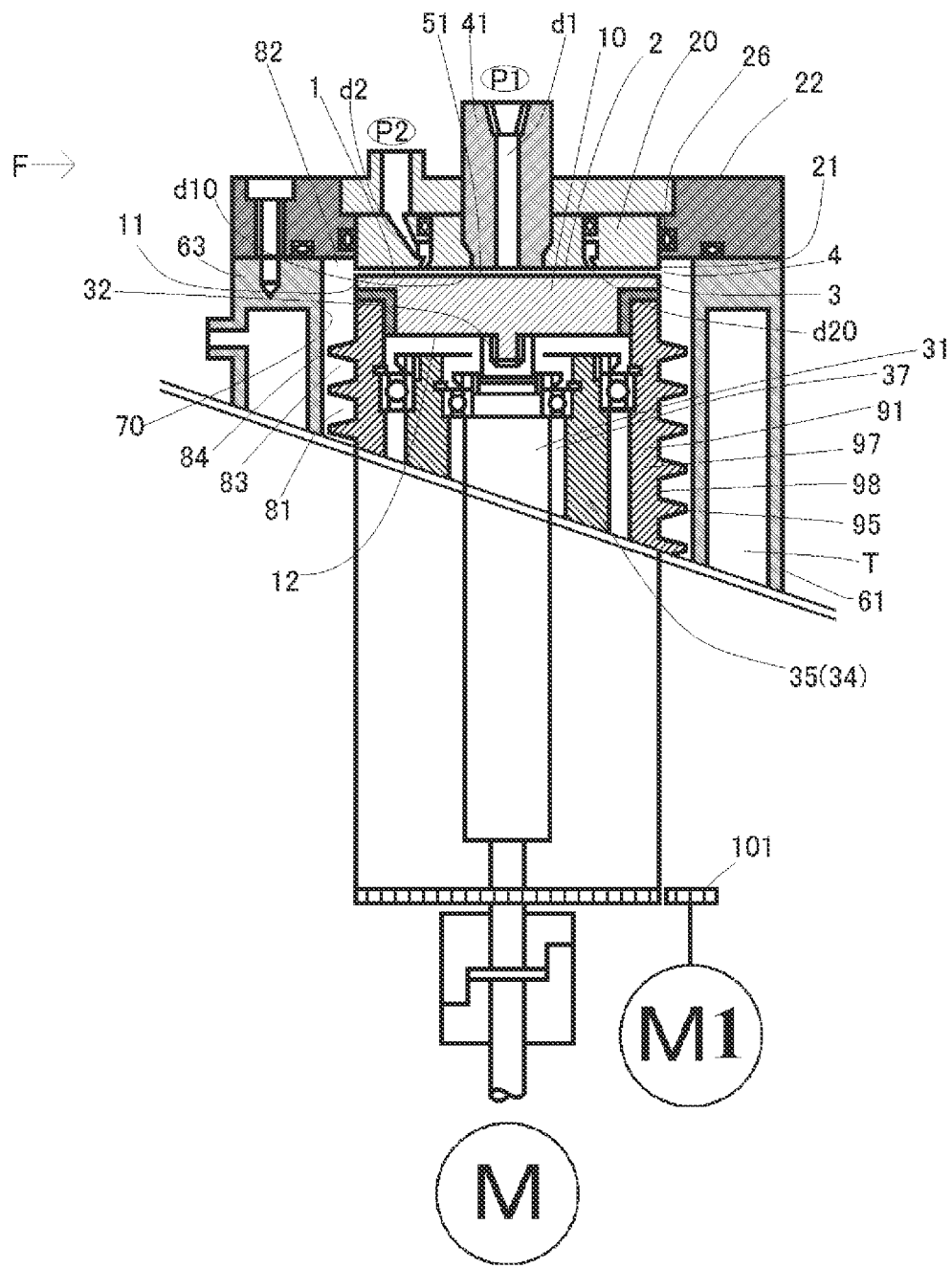
FIG. 13 This is an explanatory drawing of the essential part of the fluid processing apparatus according to still another embodiment of the present invention.

FIG. 13 shows still another example, in which the bottom member 91 is driven independent of the first processing member 10.

In this embodiment, the first processing member 10 is a thin column, i.e., a disk body, in the upper part thereof, a brim part for receiving the bottom member 91 is provided. The upper surface of the first processing member 10 is the first processing surface 1.

In this embodiment, the bottom member 91 is a columnar shape, and the protruding part 95 that protrudes outward in the radius direction to the downstream-side processing space 81 from an outer circumferential 98 of the bottom member 91 is provided. The protruding part 95 is tapered from the base end to the front end thereof.

A minute clearance in the range of about 0.01 to 1 mm is formed between the front end of the protruding part 95 and the inner circumferential surface 70 of the circumferential wall part 63 of the outer casing 61.

The space between the lower surface of the brim part of the first processing member 10 and the upper surface of the bottom member 91 are sealed by a seal member, and the first processing member 10 and the bottom member 91 liquid-tightly and airtightly are attached.

The bottom member 91 rotates by means of the rotation drive mechanism M1 such as an electric motor, which is different from the rotation drive mechanism M that is to rotate the first processing member 10. As one example thereof, the bottom member 91 rotates by means of the rotation drive mechanism M1 via a rotation power transmitting means such as gear 101 and shifting means. With such a configuration, the first processing member 10 and the bottom member 91 rotate concentrically, but the bottom member 91 is driven independently of the first processing member 10. This configuration is advantageous when it is desired to rotate the bottom member 91 at a different rotation speed from the first processing member 10.

The rotation support part 34 mounts the rotation axis 31 in the through hole 37 to pivotally support the rotation axis 31 and supports the bottom member 91 in the outer circumferential side of the axis part 35 by using the bearing or the like.

Figure 14:
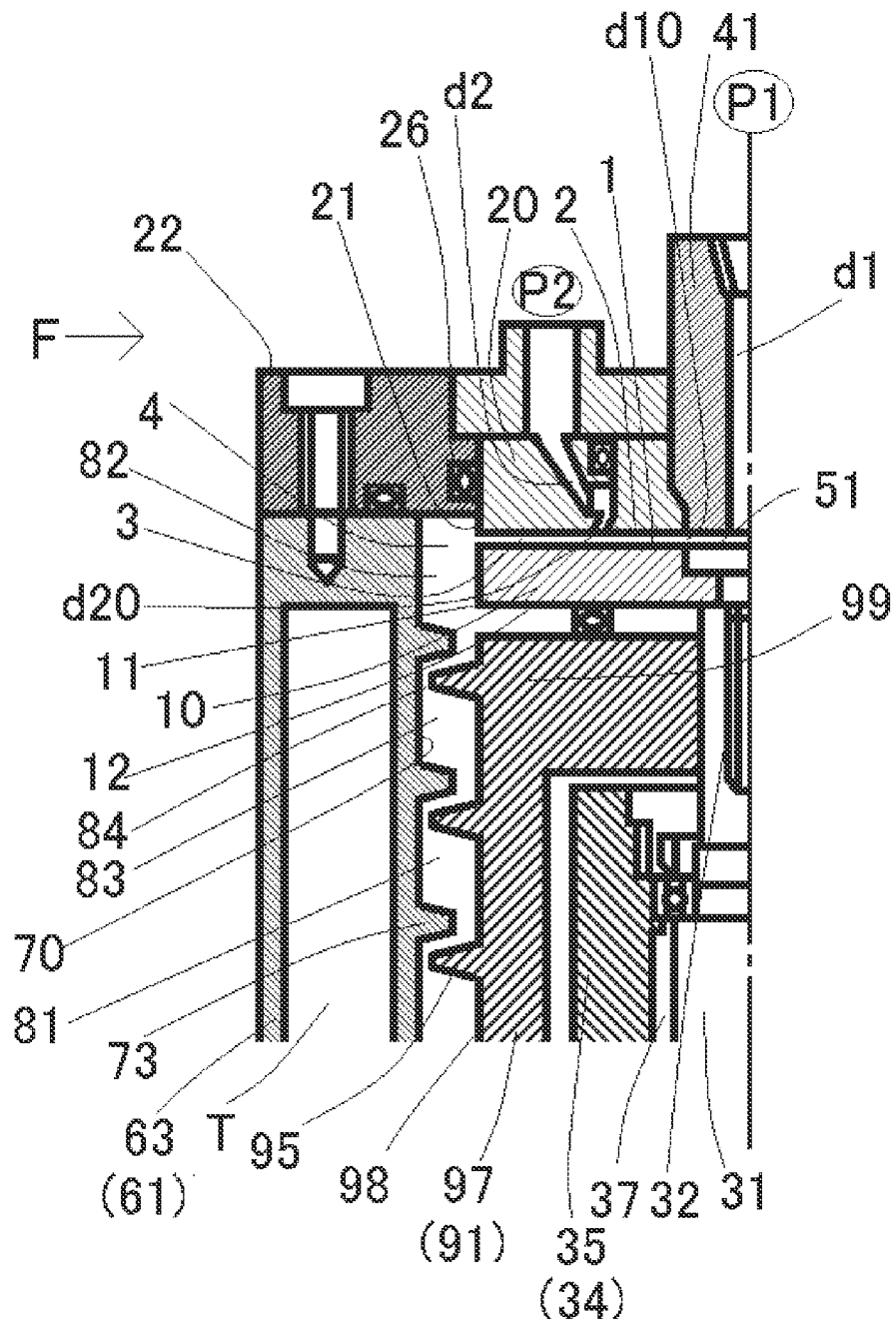
FIG. 14 This is an explanatory drawing of the essential part of the fluid processing apparatus according to still another embodiment of the present invention.

FIG. 14 shows still another example, in which the protruding part 73 that protrudes inward in the radius direction from the inner circumferential surface 70 of the circumferential wall part 63 of the cylindrical shape of the outer casing 61 to the downstream-side processing space 81 is provided, and also the protruding part 95 that protrudes outward in the radius direction from the outer circumferential surface 98 of a circumferential wall part 97 of the bottom member 91, which is column part, to the downstream-side processing space 81. The embodiment may be shown in which the protruding part 95 is received between the protruding part 73 and the protruding part 73, and the protruding parts 73 are received between the protruding part 95 and the protruding part 95. The protruding parts 73 and 95 are inclined from the base end to the front end thereof. In this embodiment, the space between the protruding part 95 of the bottom member 91 and the inner circumferential surface 70 of the circumferential wall part 63 of the outer casing 61 may serve as the seal part 84, but in addition to this, the space between the protruding part 73 of the outer casing 61 and the outer circumferential surface 98 of the circumferential wall part 97 of the bottom member 91 may serve as the seal part 84. Here, the bottom member 91 is a cylindrical shape having an upper part 99 as the column part forming a columnar shape as a whole.

A minute clearance in the range of about 0.01 mm to 1 mm is formed between the front end of the protruding part 95 and the inner circumferential surface 70 of the circumferential wall part 63 of the outer casing 61.

Figure 15:
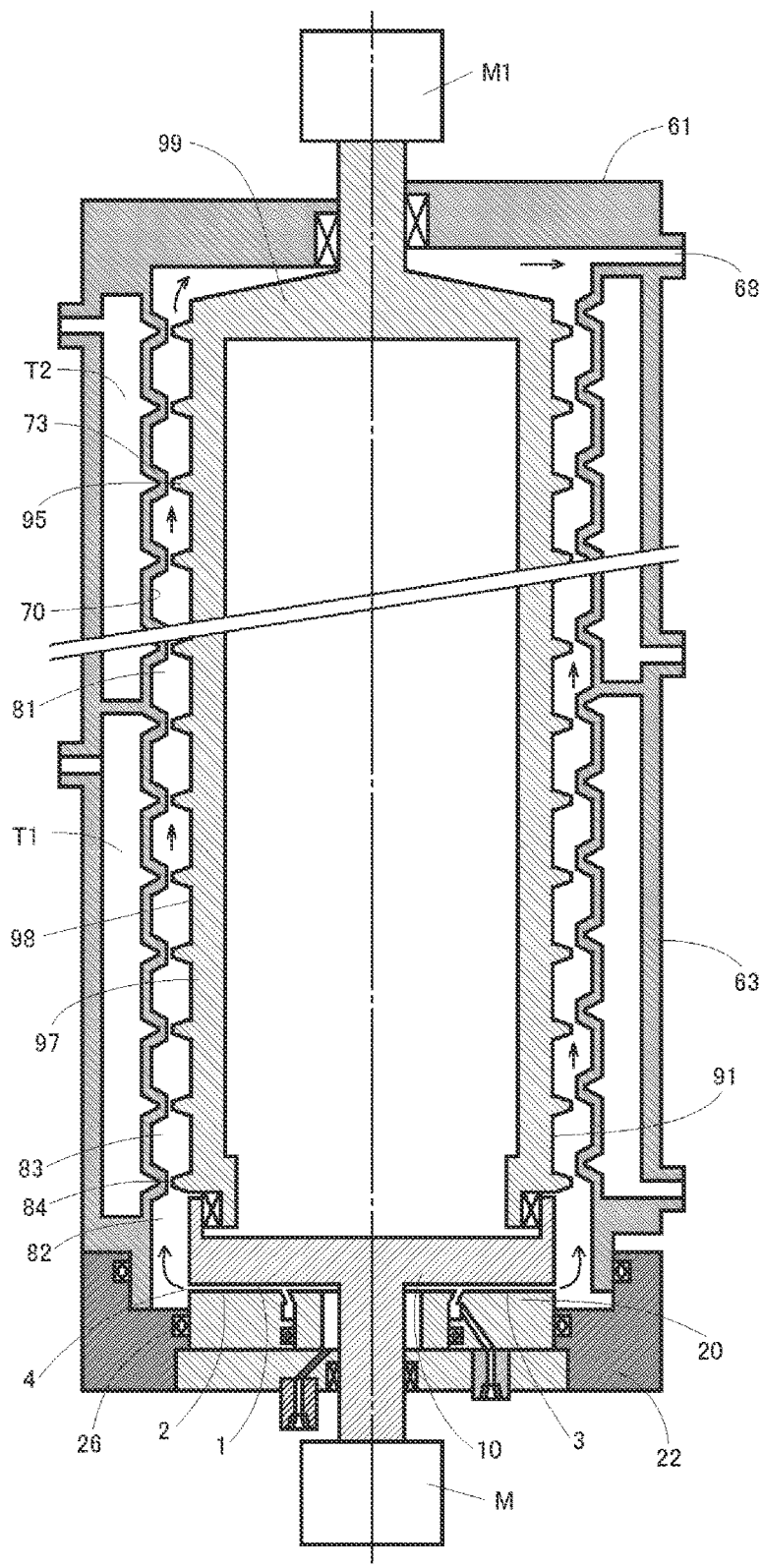
FIG. 15 This is a rough cross-section view of the fluid processing apparatus according to still another embodiment of the present invention.

FIG. 15 shows still another example. In this example, the lower side of FIG. 15 is the upstream side, the upper side of FIG. 15 is the downstream side, and the second processing member 20 is arranged in the lower side of the first processing member 10 and includes the downstream-side processing part in the upper side of the first and second processing surfaces 1 and 2 that define the upstream-side processing part. For example, when an emulsion polymerization reaction or a suspension polymerization reaction is conducted, the upstream-side processing part is in a suitable emulsion state or suspension state, and it is suitable for the case of discharging a gas generated during reaction to the outside of the system when performing polymerization reaction in the downstream-side processing part. Note that the fluid processing apparatus F according to the present invention can be installed regardless of the up, down, right, and left; this may be installed horizontally as well.

In this example, the protruding part 73 of the outer casing 61 and the protruding part 95 of the bottom member 91 are arranged in the position opposite to each other, the bottom member 91 and the first processing member 10 are driven independently, and the outer casing 61 is provided so as to be movable in upward and downward directions (axial direction of the rotation).

More specifically, the outer casing 61 is a cylindrical shape having an upper part and is provided with a plurality of the protruding parts 73 that protrude inward in the radius direction from the inner circumferential surface 70 of the circumferential wall part 63 to the downstream-side processing space 81, and the protruding part 73 has a circular shape in its plan view. The bottom member 91 is a cylindrical shape having the upper part 99 as column part having a columnar shape as a whole and is provided with a plurality of the protruding parts 95 that protrude to outward in the radius direction from the outer circumferential surface 98 of the circumferential wall part 97 to the downstream-side processing space 81, and the protruding part 95 has a circular shape in its plan view. The protruding part 73 of the outer casing 61 and the protruding part 95 of the bottom member 91 are arranged in the position opposite to each other. Here, the fact that the protruding part 73 and the protruding part 95 are arranged in the position opposite to each other means that the protruding part 73 and the protruding part 95 are arranged close to each other or overlapped each other in the radius direction.

In this embodiment, the outer casing 61 is provided so as to be movable in upward and downward directions by means of an attachment position adjustment mechanism (not shown). By providing the outer casing 61 so as to be movable in upward and downward directions, the size of the seal part 84 can be adjusted. It is advantageous since a comparatively large size of the seal part 84 can be provided by adjusting the size of the seal part 84 when a gas generated during the reaction is desired to be removed or when a highly viscous substance to be processed is processed. In FIG. 15, a state in which the outer casing 61 is lowered is illustrated on the left side of the center line, and the state in which the outer casing 61 is raised is illustrated on the right side of the center line. The specific configuration of the attachment position adjusting mechanism is not particularly restricted, any linearly sending means such as a sending mechanism by a screw, a fluid pressure driving mechanism such as air, oil pressure, or the like may be employed by appropriately selecting them.

In this embodiment, the temperature adjusting mechanism T is installed in the outer casing 61, the temperature thereof is adjusted by heating or cooling, so that the temperature of the fluid flowing in the downstream-side processing space 81 is adjusted. As the temperature adjusting mechanism T, the outer casing 61 is provided with a temperature adjusting jacket for flowing various heat media including iced water and steam. One temperature adjusting jacket may be installed in the outer casing 61, or as shown in FIG. 15, a plurality of the temperature adjusting jackets (in FIG. 15, two jackets of T1 and T2) may be installed in the outer casing 61. Further, when a plurality of the temperature adjusting jackets are used, these jackets may be adjusted to the same temperature or may be adjusted to different temperatures. By adjusting a plurality of the temperature adjusting jackets to different temperatures, the temperature of the fluid flowing through the downstream-side processing space 81 can be adjusted according to the progress of the downstream-side processing. In place of the temperature adjusting jacket, a cooling element and a heat-generating element may be attached to at least any one of the members.

In the Case of Applying Shear Force to Fluid

Figure 8:
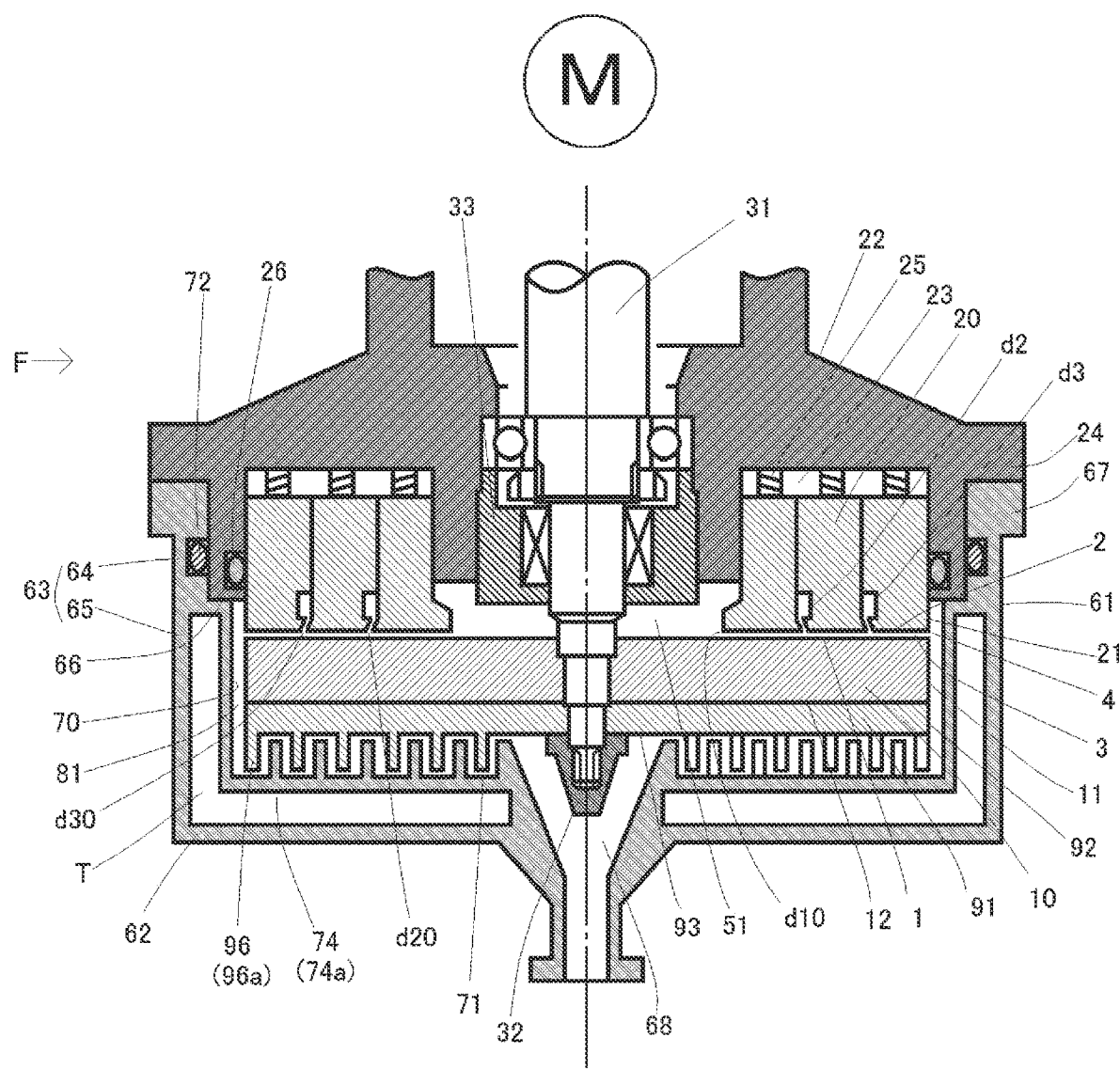
FIG. 8 This is a rough cross-section view of the fluid processing apparatus according to still another embodiment of the present invention.
Figure 9:
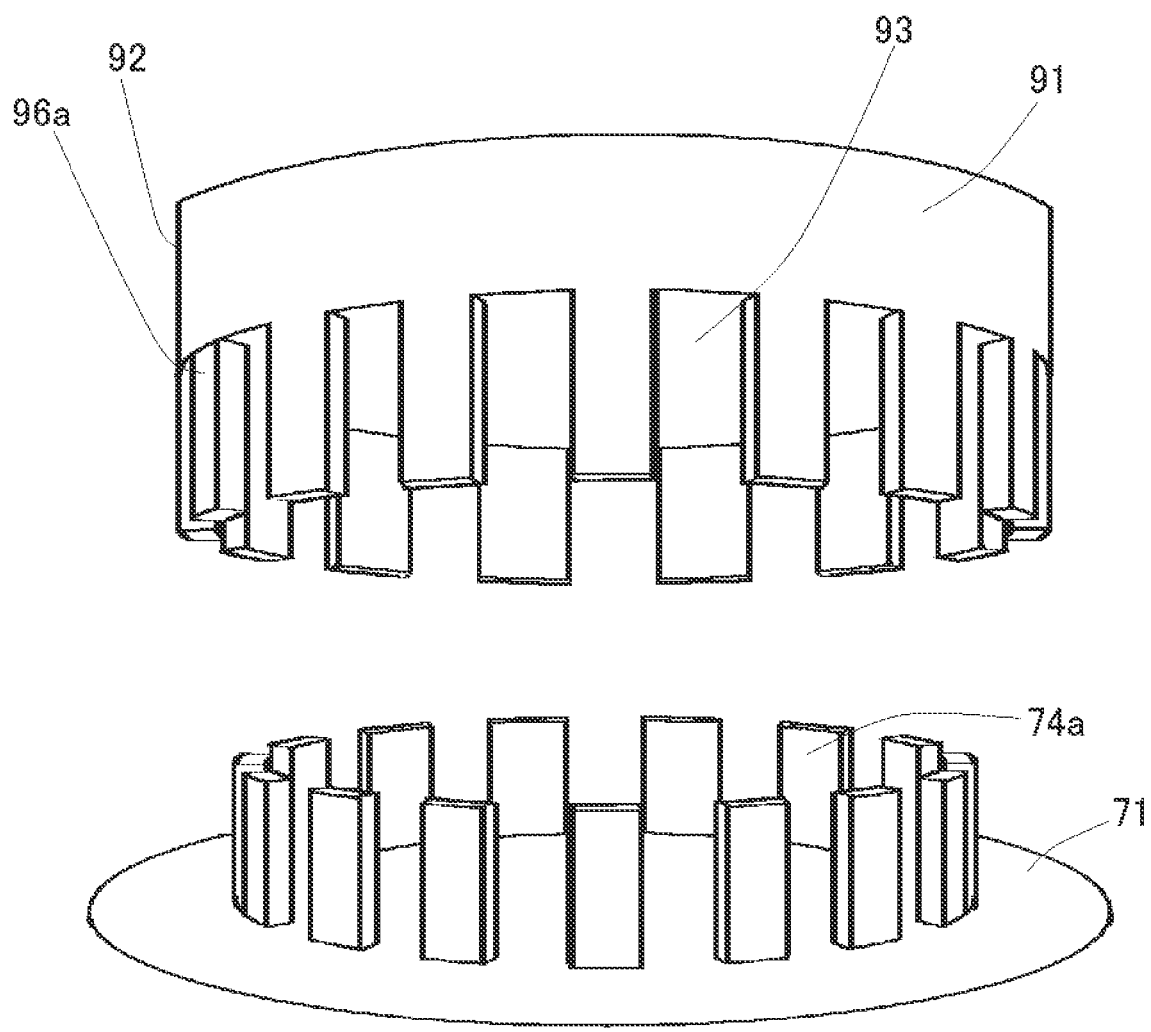
FIG. 9 This is an explanatory drawing of the protruding parts of the bottom member and the protruding parts of the outer casing, these being arranged as a set in the fluid processing apparatus shown in FIG. 8. The protruding parts of the bottom member are shown as a perspective view seen from a lower side, and the protruding parts of the outer casing are shown as a perspective view seen from an upper side.

Still another embodiment is shown in FIG. 8, though this is not the example of the labyrinth seal mechanism, the embodiment provided that the bottom member 91 is arranged in the outer end surface 12 of the first processing member 10, a comb-like protruding parts 96 that protrude downward to the downstream-side processing space 81 from the lower surface 93 of the bottom member 91 and a comb-like protruding parts 74 that protrude upward to the downstream-side processing space 81 from the inner surface 71 of the bottom part 62 of the outer casing 61, the protruding part 74 is received between the protruding part 96 and the protruding part 96, and the protruding part 96 is received between the protruding part 74 and the protruding part 74 may be described. The bottom member 91 is attached to the first processing member 10 so as to rotate in the same body as the first processing member 10. With such arrangement, a shear force can be applied to the fluid passing between the protruding part 96 and the protruding part 74. More specifically, due to the rotation of the bottom member 91 in the same body as the first processing member 10, the comb-like protruding part 96 arranged in the bottom member 91 rotates, when passing the rotating comb-like protruding parts 96 through between the comb-like protruding part 74 and protruding part 74, a shear force can be applied to the fluid to be processed in a minute clearance between the protruding part 96 and the protruding part 74. In order to efficiently apply the shear force to the fluid passing through between the protruding part 96 and the protruding part 74, the clearance between the protruding part 96 and the protruding part 74 is preferably in the range of about 0.1 to 1 mm. Also, A minute clearance in the range of about 0.5 mm to 2 mm is formed between the front end of the comb-like protruding part 96 and the inner surface 71 of the bottom part 62 of the outer casing 61, and a minute clearance in the range of about 0.5 mm to 2 mm is formed between the front end of the comb-like protruding part 74 and the lower surface 93 of the bottom member 91. In FIG. 8, Regarding the comb-like protruding parts 96 and 74, FIG. 8 shows that on the left side of the center line, the comb-like protruding parts 96 and 74 are overlapped each other, on the right side of the center line, they are not overlapped each other. FIG. 9 shows the explanatory view of a set of the comb-like protruding 96a and the comb-like protruding part 74a arranged in the outermost side in the radius direction. For ease of understanding, only the inner surface 71 of the bottom part 62 and the comb-like protruding part 74a in the outer casing 61 are illustrated.

Movement of Fluid to be Processed

The fluid being subjected to the upstream-side processing is discharged from the downstream end of the upstream-side processing space 3. The fluid discharged from the downstream end of the upstream-side processing space 3 is received in the outer casing 61, and while flowing through the downstream-side processing space 81, the reaction is performed as the downstream-side processing to obtain a reaction product, and then, the fluid is discharged from the outflow part 68 to outside of the system (outside of the apparatus).

Centrifugal Force

Since the first processing member 10 and the bottom member 91, which are the rotation member, rotate, a centrifugal force acts outward in the radius direction when the fluid flowing through the downstream-side processing space 81 fills the downstream-side processing space 81. By the action of this centrifugal force, the retention time of the fluid in the downstream-side processing space 81 is controlled.

Specifically, for example, by adjusting the rotation number of the first processing member 10 and the bottom member 91, the centrifugal force acting on the fluid flowing through the downstream-side processing space 81 is adjusted to control the retention time of the fluid in the downstream-side processing space 81. In order to control this retention time, the circumferential velocity in the outer circumference of the first processing member 10 is appropriate in the range of 0.5 to 35 m/sec. The rotation number of the rotation member may be set by both the upstream-side processing and the downstream-side processing. For example, under the laminar flow condition in the upstream-side processing space 3, the rotation number of the first processing member 10 in the downstream-side processing may be set from the range of the rotation number of the first processing member suitable for the upstream-side processing.

When focusing on the adjustment of the retention time, by arranging the labyrinth seal mechanism in the downstream-processing part, or by increasing the volume of the downstream-side processing space 81, or by slowing the discharge speed at which the fluid being subjected to the downstream-side processing is discharged from the outflow part 68 to the outside of the system, the retention time of the fluid in the downstream-side processing space 81 can be extended. The retention time of the fluid in the downstream-side processing space 81 is preferably in the range of about 2 to 30 minutes, more preferably in the range of about 3 to 10 minutes, but when the fluid processing is a polymerization reaction or the like, the retention time may be required for several hours in some cases. When the introduction amounts of the raw material, namely, the introduction velocity of the first fluid and the second fluids into the upstream-side processing space 3 (introduction amount per unit time) is adjusted, the relative rotation number of the first and second processing members are kept constant, the retention time can be adjusted even when the parts are not replaced.

Material

The outer casing 61 may be configured as a single member or of a combination of plurality of members; the material thereof is not only metal, but also ceramics such as silicon carbide (SiC), sintered metal, abrasion-resistant steel, sapphire, and other metal subjected to hardening treatment, and rigid material subjected to lining, coating, or plating and the like, the materials equivalent to those first and second processing members 10 and 20 can be adopted. In the bottom member 91, materials that can be readily processed such as metals like stainless steel and titanium, and resins like polytetrafluoroethylene (PTFE) and polyether ether ketone (PEEK) may be selected and used.

Temperature Adjusting Mechanism

At least any one of the first processing member 10, the bottom member 91, and the outer casing 61 may be equipped with the temperature adjusting mechanism T, the temperature of these members may be adjusted by cooling or heating. By so doing, the temperature of the fluid flowing thorough the downstream-side processing space 81 can be adjusted. In the embodiments shown in FIG. 1, FIG. 4 to FIG. 8, FIG. 10, and FIG. 12 to FIG. 14, as the temperature adjusting mechanism T, the temperature adjusting jackets through which various heat media including iced water and steam flow are provided on the outer casing 61. In place of the heat media, a cooling element and a heat-generating element may be attached to at least any one of the members.

Microwave

At least any one of the first processing member 10, the bottom member 91, and the outer casing 61 may be equipped with a microwave-generating device such as a magnetron for irradiating the microwave as a microwave irradiation mechanism, so that the fluid flowing through the downstream-side processing space 81 may be heated, and a chemical reaction thereof may be facilitated.

Pressure Adjusting Mechanism

The first processing member 10, the bottom member 91, and the outer casing 61 may be equipped with a pressure adjusting mechanism for adjusting the pressure of the fluid flowing through the downstream-side processing space 81. For example, various pumps can be used as the pressure adjusting mechanism. Negative pressure may be applied to the downstream-side processing space 81. Specifically, the downstream-side processing space 81 may be pressurized by a nitrogen gas, or a vacuum degree in the downstream-side processing space 81 may be controlled by a vacuum pump.

Control of Processing Characteristics

By performing the upstream-side processing and the downstream-side processing using the fluid processing apparatus of the present invention, reaction conditions such as temperature condition, pressure condition, stirring condition, and reaction time in the reaction field can be adjusted, thus, for example, the processing characteristics such as the reaction rate of the raw material, selectivity, and yield of the product can be controlled. Here, the reaction rate of the raw material is a ratio of the raw material consumed by the reaction to the supplied raw material, the selectivity is a ratio of the raw material consumed by the reaction consumed to produce an intended product, and the yield of the product is the multiplied value of the reaction rate by the selectivity.

Under Laminar Flow Condition and Non-Laminar Flow Condition

In the present invention, it is preferable that the upstream-side processing in the upstream-side processing space 3 be performed under a laminar flow condition and the downstream-side processing in the downstream-side processing space 81 be performed under a non-laminar flow condition. It is preferable that the second fluid be merged with the first fluid which become the thin film fluid in the upstream-side processing space 3 under the laminar flow condition and the fluids to be processed be uniformly mixed by the molecular dispersion under the laminar flow condition. The fluid discharged from the downstream end of the upstream-side processing space 3 is released from the forcing applied by the processing surfaces 1 and 2, and then, the fluid is discharged to the wider downstream-side processing space 81. On the other hand, A turbulent state is created by applying shear force to the fluid discharged from the downstream end of the upstream-side processing space 3 to the downstream-side processing space 81 or by increasing the representative length L described in the above-described formula (1), in this state, a product may be obtained by increasing the frequency of contact and collision among the molecules in the fluid. For example, when it is desired to disperse organic pigment particles after preparing the organic pigment particles by an organic reaction in the upstream-side processing space 3, the stirring under the turbulent flow condition is useful. In addition, under the turbulent flow condition, the enhancement of the heat exchange efficiency can be expected between heat medium flowing through the temperature adjusting mechanism T and the fluid flowing through the downstream-side processing space 81.

The fluid processing method using the fluid processing apparatus F according to the present invention can be applied to various fluids to be processed described in Japanese Patent Laid-Open Publication No. 2009-082902, as well as to various reactions.

REFERENCE NUMERALS

1 First processing surface
2 Second processing surface
3 Upstream-side processing space
4 Upstream-side outflow port
10 First processing part
20 Second processing part
61 Outer casing
81 Downstream-side processing space
83 Pool part
84 Seal part
91 Bottom member
F Fluid processing apparatus

The invention claimed is:

1. A fluid processing apparatus comprising
an upstream-side processing part defined by at least two processing surfaces that rotate relative to each other and a downstream-side processing part arranged in downstream-side of the upstream-side processing part,
the upstream-side processing part is configured to perform an upstream-side processing to a fluid to be processed by passing the fluid to be processed through into an upstream-side processing space defined by the at least two processing surfaces, and
the downstream-side processing part is provided with a downstream-side processing space which performs the function of retaining and mixing the fluid to be processed by a labyrinth seal, and
an upstream-side outflow port of the fluid to be processed from the upstream-side processing part is open into the downstream-side processing space, and
the downstream-side processing space is configured to perform the function of controlling retention time by using the labyrinth seal.

2. The fluid processing apparatus according to claim 1, wherein
the downstream-side processing space comprises a narrow seal space and a retention space that is arranged in the upstream side of the seal space and is wider than the seal space.

3. The fluid processing apparatus according to claim 1, wherein
the upstream-side outflow port is open to the retention space.

4. The fluid processing apparatus according to claim 2, wherein
in the downstream-side processing part, a plurality of the pairs of the seal space and the retention space are continuously arranged from an upstream to a downstream of the flow of the fluid to be processed.

5. The fluid processing apparatus according to claim 1, wherein
the downstream-side processing part comprises a cylindrical receiving part that defines the downstream-side processing space and a column part that is received in the cylindrical receiving part, and
by rotating at least any one of the cylindrical receiving part and the column part, the cylindrical receiving part and the column part relatively rotate.

6. The fluid processing apparatus according to claim 2, wherein
the at least two processing surfaces are disk-like processing surfaces arranged so as to be apart from each other in an axial direction of rotation of the processing surfaces, and
the upstream-side processing part is configured such that the fluid to be processed is passed through the upstream-side processing space with a center side of the rotation of the processing surfaces as an upstream and an outer circumferential side of the rotation as a downstream, thereby discharging the fluid from the upstream-side outflow port in the outer circumferential end of the upstream-side processing space, wherein the downstream-side processing part is provided with an annular receiving space in the outer circumferential side of the upstream-side outflow port, and the receiving space is the most upstream space in the downstream-side processing space and is the space wider than the seal space.

7. The fluid processing apparatus according to claim 5, wherein the rotation of at least any one of the cylindrical receiving part and the column part is performed independently of the rotation of the processing surface of the upstream-side processing part.

8. The fluid processing apparatus according to claim 5, wherein the rotation of at least any one of the cylindrical receiving part and the column part is performed integrally with the rotation of the processing surface of the upstream-side processing part.

9. The fluid processing apparatus according to claim 2, wherein size of the seal space can be adjusted.

10. The fluid processing apparatus according to claim 1, wherein a temperature adjusting mechanism is installed for the purpose of controlling a temperature of the fluid to be processed in the downstream-side processing space.

11. The fluid processing apparatus according to claim 10, wherein the temperature can be adjusted respectively by installing a plurality of the temperature adjusting mechanisms.

12. The fluid processing apparatus according to claim 1, wherein a clearance between the at least two processing surfaces is mechanically set.

13. The fluid processing apparatus according to claim 12, wherein the apparatus is provided with a clearance measurement sensor to measure the clearance and a clearance adjusting mechanism that automatically moves one processing surface of the at least two processing surfaces based of the measurement result of the clearance measurement sensor, the position of the one processing surface is variable.

14. The fluid processing apparatus according to claim 1, wherein a microwave irradiating mechanism to the fluid to be processed in the downstream-side processing space is installed.

15. The fluid processing apparatus according to claim 1, wherein a pressure adjusting mechanism is installed for the purpose of controlling a pressure of the fluid to be processed in the downstream-side processing space.

16. The fluid processing apparatus according to claim 1, wherein an introduction part is arranged in the downstream-side processing space to introduce a fluid to be processed other than the fluid to be processed introduced from the upstream-side processing part.

17. The fluid processing apparatus according to claim 1, wherein a discharge port is arranged in the downstream-side processing space to discharge a gas that is generated due to the upstream-side processing and/or the downstream-side processing performed in the downstream-side processing part.

18. The fluid processing apparatus according to claim 1, wherein a plurality of the discharge ports is arranged in the downstream-side processing part for the purpose of enabling discharge of the fluid to be processed in the downstream-side processing space for each retention time.

19. The fluid processing apparatus according to claim 1, wherein the fluid processing apparatus is configured such that the upstream-side processing in the upstream-side processing part is performed to the fluid to be processed under a laminar flow condition and the downstream-side processing in the downstream-side processing part is performed to the fluid to be processed under a non-laminar flow condition.

20. The fluid processing apparatus according to claim 2, wherein the upstream-side outflow port is open to the retention space.

* * * * *